United States Patent
Li et al.

(10) Patent No.: US 12,506,947 B2
(45) Date of Patent: Dec. 23, 2025

(54) VISUAL INSPECTION APPARATUS AND INSPECTION METHOD THEREOF, AND INSPECTION SYSTEM AND INSPECTION METHOD THEREOF

(71) Applicant: CONTEMPORARY AMPEREX TECHNOLOGY (HONG KONG) LIMITED, Hong Kong (CN)

(72) Inventors: Wushu Li, Fujian (CN); Guijia Qiu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/429,510

(22) Filed: Feb. 1, 2024

(65) Prior Publication Data
US 2024/0430556 A1    Dec. 26, 2024

Related U.S. Application Data

(63) Continuation of application No. PCT/CN2023/101897, filed on Jun. 21, 2023.

(51) Int. Cl.
*H04N 23/56*    (2023.01)
*G06T 5/50*    (2006.01)
*G06T 7/00*    (2017.01)
(Continued)

(52) U.S. Cl.
CPC .............. *H04N 23/56* (2023.01); *G06T 5/50* (2013.01); *G06T 7/001* (2013.01); *G06T 7/11* (2017.01);
(Continued)

(58) Field of Classification Search
CPC ..... Y02E 60/10; G01B 11/022; G01B 11/002; G01B 11/02; G01B 11/03; G01B 11/24;
(Continued)

(56) References Cited

U.S. PATENT DOCUMENTS

2011/0310244 A1* 12/2011 Schweitzer ............. H02S 50/15
348/92

FOREIGN PATENT DOCUMENTS

CN    109127194 A    1/2019
CN    209707400 U    11/2019
(Continued)

OTHER PUBLICATIONS

Extended European Search Report issued Feb. 4, 2025 in European Patent Application No. 23847634.5.
International Search Report and Written Opinion mailed on Dec. 22, 2023, received for PCT Application PCT/CN2023/101897, filed on Jun. 21, 2023, 22 pages including English Translation.

*Primary Examiner* — Masum Billah
(74) *Attorney, Agent, or Firm* — XSENSUS LLP

(57) ABSTRACT

This application relates to the technical field of lower box body inspection, and in particular, discloses a visual inspection apparatus and an inspection method thereof, and an inspection system and an inspection method thereof. The visual inspection apparatus includes an image acquisition apparatus, a drive apparatus, and a controller. The drive apparatus is drivingly connected to the image acquisition apparatus for driving the image acquisition apparatus to reciprocate in a length direction of a gluing region of a lower box body and acquire an inspection image of the entire gluing region. The controller is electrically connected to the image acquisition apparatus and the drive apparatus to control the acquisition of the image acquisition apparatus and the operation of the drive apparatus.

24 Claims, 14 Drawing Sheets

(51) Int. Cl.
*G06T 7/11* (2017.01)
*H04N 23/51* (2023.01)
*H04N 23/695* (2023.01)
*H01M 50/209* (2021.01)
*H01M 50/289* (2021.01)

(52) U.S. Cl.
CPC ........... *H04N 23/51* (2023.01); *H04N 23/695* (2023.01); *G06T 2207/20221* (2013.01); *G06T 2207/30108* (2013.01); *H01M 50/209* (2021.01); *H01M 50/289* (2021.01)

(58) Field of Classification Search
CPC .. G01B 2210/44; G01B 11/14; G01B 21/042; G06T 7/0004
USPC .......................................................... 348/129
See application file for complete search history.

(56) References Cited

FOREIGN PATENT DOCUMENTS

| | | | |
|---|---|---|---|
| CN | 111272081 | A | 6/2020 |
| CN | 211528246 | U | 9/2020 |
| CN | 113899745 | A | 1/2022 |
| CN | 114283183 | A | 4/2022 |
| CN | 114863081 | A | 8/2022 |
| CN | 115049659 | A | 9/2022 |
| CN | 217738458 | U | 11/2022 |
| DE | 102020203850 | A1 | 9/2021 |
| EP | 3611496 | A1 * | 2/2020 |
| JP | 2004314347 | A * | 11/2004 |
| KR | 2016-0095380 | A | 8/2016 |

\* cited by examiner

VISUAL INSPECTION APPARATUS AND INSPECTION METHOD THEREOF, AND INSPECTION SYSTEM AND INSPECTION METHOD THEREOF

CROSS-REFERENCE TO RELATED APPLICATION

The present application is a Continuation of International Application No. PCT/CN2023/101897, filed on Jun. 21, 2023, which is incorporated herein by reference in its entirety.

TECHNICAL FIELD

This application relates to the technical field of lower box body inspection, and in particularly, to a visual inspection apparatus and an inspection method thereof, and an inspection system and an inspection method thereof.

BACKGROUND

In the manufacturing process of battery modules and battery packs, a lower box body is first applied with glue to fix a module in the box body by gluing. The gluing process is eminently important, and a more or less amount of glue applied may lead to deterioration of thermal conductivity, and a less amount of glue applied affects the structural strength of the battery pack, leading to movement of batteries in the battery pack, which will cause great harm to the safety of the vehicle.

At present, scanning is typically performed with a line array laser sensor while the glue is being applied, so as to determine a gluing position and whether there is glue breakage or shortage of glue. However, this image acquisition method can only implement inspection for small cross-sectional adhesive strips, and cannot satisfy the requirements for large-surface gluing inspection.

SUMMARY

A main objective of this application is to provide a visual inspection apparatus aimed at satisfying the requirements for large-surface gluing inspection on a lower box body.

To implement the foregoing objective, the visual inspection apparatus proposed in this application includes:
  an image acquisition apparatus;
  a drive apparatus, where the drive apparatus is drivingly connected to the image acquisition apparatus for driving the image acquisition apparatus to reciprocate in a length direction of a gluing region of a lower box body and acquire an inspection image of the entire gluing region; and
  a controller, where the controller is electrically connected to the image acquisition apparatus and the drive apparatus to control the acquisition of the image acquisition apparatus and the operation of the drive apparatus.

The visual inspection apparatus includes a controller, an image acquisition apparatus, and a drive apparatus. Under the control of the controller, the drive apparatus can drive the image acquisition apparatus to reciprocate in a length direction of the gluing region so that the image acquisition apparatus can obtain an inspection image of an overall structure of the gluing region, allowing for a more macroscopic observation of overall gluing conditions of the gluing region, which helps to better determine whether the gluing is acceptable.

The visual inspection apparatus can macroscopically acquire an overall appearance of the gluing region, which facilitates the inspection of whether there are defects such as bubbles, debris, or glue breakage in the gluing region, thereby making a better determination on whether the gluing on the lower box body is acceptable.

In an embodiment of this application, the visual inspection apparatus further includes a light source. The light source is disposed on one side of the image acquisition apparatus and electrically connected to the controller, and the light source is configured to emit light toward the gluing region.

Herein, with the provision of the light source, it is possible to provide better acquisition light for the image acquisition apparatus, improving the image acquisition effect.

In an embodiment of this application, the image acquisition apparatus includes a line scan camera; and/or
  the light source includes a linear light source.

The line-scan camera provides higher resolution and better imaging effect, thereby further improving the image acquisition effect.

Herein, the linear light source has better consistency and uniformity and can provide better complementary light for the image acquisition apparatus.

In an embodiment of this application, the light source includes a first light source and a second light source. The first light source is disposed on one side of the image acquisition apparatus in a moving direction, the second light source is disposed on the other side of the image acquisition apparatus in the moving direction, and the first light source and the second light source have different emission angles.

Herein, at least one of the first light source and the second light source can be selected for supplementary lighting, so that supplementary lighting can be provided from different directions to obtain images with reflections at different positions, and true and effective inspection images can be obtained through the elimination of reflections to improve inspection accuracy.

In an embodiment of this application, the controller is further configured to: turn on the first light source and control the image acquisition apparatus to move from one side in the length direction of the gluing region to the other side opposite thereto; and turn on the second light source and control the image acquisition apparatus to move from the other side in the length direction of the gluing region to the side opposite thereto.

For example, the first light source is close to the left side of the gluing region and the second light source is close to the right side of the gluing region. The controller controls the image acquisition apparatus to move from the left side of the gluing region to the right side and acquire a first image while controlling the first light source to turn on, and controls the image acquisition apparatus to move from the right side of the gluing region to the left side and acquire a second image while controlling the second light source to turn on, implementing automatic acquisition of at least two images with different reflective positions and improving inspection efficiency.

In an embodiment of this application, the light source is movably disposed relative to the image acquisition apparatus to adjust the emission angle of the light source relative to a horizontal plane; and/or
  an included angle between the emission angle of the light source and the axis of the image acquisition apparatus is in a range of greater than or equal to 30° to less than or equal to 60°.

Herein, the emission angle of the light source relative to the horizontal plane can be adjusted so that changes can be made according to different types and sizes of the lower box body, thereby obtaining more accurate inspection images.

The included angle between the emission angle of the light source and the axis of the image acquisition apparatus is set in a range, which can further facilitate the acquisition of more realistic inspection images.

This application further provides an inspection method of a visual inspection apparatus, the visual inspection apparatus including a drive apparatus, an image acquisition apparatus, and a controller. The inspection method includes the steps of:

sending a driving instruction to the drive apparatus so that the drive apparatus drives the image acquisition apparatus to reciprocate in a length direction of a gluing region of a lower box body, and sending an image acquisition instruction to the image acquisition apparatus so that the image acquisition apparatus acquires an inspection image of the gluing region; and obtaining the inspection image and sending it to a server.

In this inspection method, it is possible to control the drive apparatus and the image acquisition apparatus to achieve the effect of automatically acquiring an inspection image of the overall topography of the gluing region, so that defects in the gluing region can be conveniently determined in a macroscopic manner, reducing the risk of oversight.

In an embodiment of this application, the visual inspection apparatus includes a first light source and a second light source. The first light source is disposed on one side of the image acquisition apparatus in a moving direction, the second light source is disposed on the other side of the image acquisition apparatus in the moving direction, and the first light source and the second light source have different emission angles. The inspection method of the visual inspection apparatus includes:

sending an instruction to turn on the first light source;

sending a driving instruction to the drive apparatus to move the image acquisition apparatus from one side of the gluing region close to the first light source to the other side opposite thereto, and sending an acquisition instruction to the image acquisition apparatus to acquire a first image;

obtaining the first image and sending it to a server;

sending an instruction to turn on the second light source and turn off the first light source;

sending a driving instruction to the drive apparatus to move the image acquisition apparatus from one side of the gluing region close to the second light source to the other side opposite thereto, and sending an acquisition instruction to the image acquisition apparatus for acquiring a second image; and obtaining the second image and sending it to the server.

A first image having a reflective region can be obtained with the cooperation of the first light source and the drive apparatus, and a second image having a reflective region can be obtained with the cooperation of the second light source and the drive apparatus. Due to the different positions and emission angles of the first light source and the second light source, positions of the reflective regions of the first image and the second image are different. Therefore, a more realistic and complete inspection image of the gluing region can be obtained after the two images are combined, preventing oversight due to the reflections or the obstruction of the box body and providing the server with better image data. The inspection method can improve the inspection accuracy.

This application also proposes an inspection system including:

a visual inspection apparatus, being the foregoing visual inspection apparatus; and a server, electrically connected to the controller and configured to receive and determine whether the gluing region is up to standard based on the inspection image.

The visual inspection apparatus can macroscopically acquire an overall appearance of the gluing region, and the server can make a more accurate determination based on the inspection image, improving the accuracy in the inspection of the gluing condition of the gluing region. Use of the inspection image obtained by the visual inspection apparatus can facilitate the inspection of whether there are defects such as bubbles, debris, or glue breakage in the gluing region, thereby making a better determination on whether the gluing on the lower box body is acceptable.

In an embodiment of this application, the inspection system further includes a chassis. The chassis includes two frames disposed oppositely and a cross beam slidably connected to the two frames, and a lower box body is accommodated between the two frames.

A drive apparatus of the visual inspection apparatus is mounted on the frame and drivingly connected to the cross beam, and the image acquisition apparatus is disposed on the cross beam and positioned above a gluing region of the lower box body to reciprocate in a length direction of the gluing region under the drive of the drive apparatus.

Herein, with the provision of the chassis, it is possible to provide a mounting base for the drive apparatus and the lower box body can be confined between the two frames, and with the provision of the cross beam, it is possible to provide a more stable movement support for the image acquisition apparatus, so that the moving direction of the image acquisition apparatus can be better maintained consistent with the length direction of the gluing region of the lower box body, improving the precision of acquisition.

In an embodiment of this application, the inspection system further includes a first drive module and a light source. The light source is disposed on one side of the image acquisition apparatus, and the first drive module is disposed on the cross beam and drivingly connected to the image acquisition apparatus and the light source for driving the image acquisition apparatus and the light source to reciprocate in a width direction of the gluing region.

With the provision of the light source, it is possible to provide supplementary lighting for the image acquisition apparatus, thereby improving the effect of acquiring the inspection image. In addition, with the provision of the first drive module, the image acquisition apparatus can reciprocate in the width direction of the gluing region to match lower box bodies with different width sizes, so as to carry out image acquisition of the entire gluing region and improve adaptability.

In an embodiment of this application, the inspection system further includes a second drive module, the cross beam is fitted with a slider, and the first drive module is drivingly connected to the slider. The second drive module is mounted on the slider and drivingly connected to the image acquisition apparatus and the light source for driving the image acquisition apparatus and the light source to reciprocate in a thickness direction of the gluing region.

With the provision of the second drive module, the image acquisition apparatus can be driven to move in the thickness direction so as to adapt to a situation in which the gluing region is not in the same plane, which further improves the accuracy of inspection image acquisition and the adaptability of the inspection system.

In an embodiment of this application, the inspection system further includes a lifting mechanism. The lifting mechanism is disposed between the two frames and drivingly connected to the lower box body for driving the lower box body to reciprocate in a vertical direction.

Herein, with the provision of the lifting mechanism, all lower box bodies can be lifted to a same height, ensuring an acquisition distance between the image acquisition apparatus and the gluing region, so as to improve the accuracy of image acquisition.

In an embodiment of this application, the lifting mechanism includes a base, a lifting assembly disposed in the base, and two clamping members disposed oppositely. The two clamping members are capable of moving towards or away from each other to clamp or release the lower box body, and the lifting assembly is drivingly connected to the clamping members for driving the clamping members up or down.

To enhance the stability of the lower box body, the clamping members are provided to fix the lower box body, making it more stable during the lifting process and preventing it from falling.

In an embodiment of this application, the server is configured to send an inspection instruction to the controller to instruct the image acquisition apparatus to acquire at least two inspection images.

The server is further configured to: obtain at least two inspection images, perform image fusion on the at least two inspection images to eliminate image reflection, and determine whether the gluing region is up to standard.

Since the images acquired by the image acquisition apparatus with the cooperation of the light source have different degrees of reflections, the server obtains at least two inspection images when obtaining the inspection images, and performs fusion on the two inspection images to eliminate the reflections, so as to improve the authenticity and validity of the inspection image. The server can make a more accurate determination based on the inspection image, improving the accuracy in the inspection of the gluing condition of the gluing region.

In an embodiment of this application, the inspection system further includes two grating gates, an inspection channel is formed between the two frames, an extension direction of the inspection channel is consistent with the length direction of the gluing region, and the inspection channel has an entrance and an exit disposed oppositely. One of the grating gates is disposed at the entrance of the inspection channel, and the other one of the grating gates is disposed at the exit of the inspection channel.

The inspection channel formed by the frames and having openings at two ends can facilitate the entry and exit of a trolley transporting the lower box body, and the provision of the grating gates at the entrance and exit can protect the inspection in the inspection channel from external interference, improving the inspection safety.

In an embodiment of this application, the inspection system includes home sensors and limit sensors. The home sensors are disposed at initial positions of the image acquisition apparatus and the light source, and the limit sensors are disposed at moving paths of the image acquisition apparatus and the light source.

With the provision of the home sensors, it is possible to accurately reset the image acquisition apparatus and the light source, so that a reset check can be performed for each inspection to calibrate the inspection system, improving the inspection accuracy. With the provision of the limit sensors, it is possible to detect whether the image acquisition apparatus moving in the moving direction has reached an intended position, improving self-check performance of the inspection system.

This application further proposes an inspection method of an inspection system. The inspection system includes a visual inspection apparatus, a server, and a light source, and the inspection method of the inspection system includes the steps of:

receiving, by the server, a request for inspecting a lower box body, and sending an inspection instruction to a controller;

receiving, by the controller, the inspection instruction, and sending a driving instruction to a drive apparatus and an acquisition instruction to an image acquisition apparatus;

driving, by the drive apparatus, the image acquisition apparatus and the light source to reciprocate in the length direction of a gluing region of the lower box body, and acquiring, by the image acquisition apparatus, an inspection image and sending it to the controller; and receiving, by the server, the inspection image sent by the controller for processing and analysis to determine whether the gluing region of the lower box body is up to standard.

The inspection method can implement image acquisition of the entire gluing region of the lower box body, and process and analyze the inspection image to accurately determine whether there are defects such as bubbles, debris, or glue breakage, thereby making a better determination on whether the gluing on the lower box body is acceptable.

In an embodiment of this application, the step of receiving, by the controller, the inspection instruction, and sending a driving instruction to a drive apparatus and an acquisition instruction to an image acquisition apparatus includes:

receiving, by the controller, the inspection instruction, and sending a reset instruction to the drive apparatus;

driving, by the drive apparatus, the image acquisition apparatus and the light source to move back to their initial inspection positions; and sending, by the controller, a driving instruction to the drive apparatus and an acquisition instruction to the image acquisition apparatus.

In this method, with the reset procedure provided, it is possible to make each inspection start from a same position, improving the accuracy and consistency of the inspection.

In an embodiment of this application, the light source includes a first light source and a second light source. The first light source is disposed on one side of the image acquisition apparatus in a moving direction, the second light source is disposed on the other side of the image acquisition apparatus in the moving direction, the first light source and the second light source have different emission angles, and the inspection instruction includes acquiring at least a first image and a second image. The inspection method includes:

issuing, by the controller, an instruction to turn on the first light source and turn off the second light source, and sending a first driving instruction;

receiving, by the drive apparatus, the first driving instruction and driving the image acquisition apparatus and the light source to move from one side in the length direction of the gluing region of the lower box body to the opposite side, and acquiring, by the image acquisition apparatus, the first image and sending it to the controller;

issuing, by the controller, an instruction to turn on the second light source and turn off the first light source, and sending a second driving instruction;

receiving, by the drive apparatus, the second driving instruction and driving the image acquisition apparatus and the light source to move from the other side in the length direction of the gluing region of the lower box body to the opposite side, and acquiring, by the image acquisition apparatus, the second image and sending it to the controller;

receiving, by the server, the first image and the second image sent by the controller, and performing image fusion processing to eliminate image reflection and obtain a target inspection image of the gluing region; and determining, by the server based on the target inspection image, whether the gluing region is up to standard.

A first image having a reflective region can be obtained with the cooperation of the first light source and the drive apparatus, and a second image having a reflective region can be obtained with the cooperation of the second light source and the drive apparatus. Due to the different positions and emission angles of the first light source and the second light source, positions of the reflective regions of the first image and the second image are different. The image fusion by the server on the two images can eliminate the reflective regions, giving a more realistic and complete inspection image of the gluing region and preventing oversight due to the reflections or the obstruction of the box body. Using such a target inspection image as the basis for determination can obtain a more accurate determination of the gluing condition, improving the inspection accuracy.

In an embodiment of this application, the step of receiving, by the server, the first image and the second image sent by the controller, and performing image fusion processing to eliminate image reflection and obtain a target inspection image of the gluing region includes:

performing, by the server, grayscale processing on the first image and the second image to obtain a first grayscale image and a second grayscale image, respectively;

performing, by the server, binarization processing on the first grayscale image and the second grayscale image to obtain a first binarized grayscale image and a second binarized grayscale image, respectively;

obtaining, by the server, an intersection region of the first binarized grayscale image and first binarized grayscale image to obtain a non-reflective region;

obtaining, by the server, a highlighted region and a shadow region of the first image and a highlighted region and a shadow region of the second image through calculation based on the first binarized grayscale image, first binarized grayscale image, and the non-reflective region; and setting, by the server based on respective highlighted regions and shadow regions of the first image and the second image, a preset weight, and superimposing the first image and the second image to obtain the target inspection image.

In this inspection method, the server performs fusion processing on the first image and the second image, and the grayscale processing and the binarization processing can determine the position of each pixel of the first image and the second image, so that when the two images are superimposed, it is more convenient to eliminate the reflective regions and obtain the target inspection image.

In an embodiment of this application, the step of setting, based on respective highlighted regions and shadow regions of the first image and the second image, a preset weight, and superimposing the first image and the second image to obtain the target inspection image includes:

setting, by the server, a proportion of a shadow region of one of the first image and the second image at a position at which the first image and the second image overlap to x, and a proportion of the shadow region of the other of the first image and the second image at the position at which the first image and the second image overlap to 1-x;

setting, by the server, a proportion of a highlighted region of one of the first image and the second image to 0 and a proportion of a shadow region of the other of the first image and the second image at a corresponding position to 1; and superimposing, by the server, the first image and the second image to obtain the target inspection image.

In this method, when the shadow region portions of the two images are superimposed, a ratio of the pixel values of the first image and the second image can be selected to be any value, which makes the superimposition more convenient. The highlighted region of the corresponding first image is completely replaced by the shadow region of the second image, and the highlighted region of the second image is completely replaced by the shadow region of the first image, thereby obtaining a target inspection image with reflections eliminated.

In an embodiment of this application, the step of determining whether the gluing region is up to standard based on the target inspection image includes:

obtaining, by the server, a standard inspection image and performing a comparison calculation with the target inspection image; and determining by the sever that the gluing region is up to standard under the condition that comparison values are consistent.

It is possible to achieve the effect of automatically determining whether the gluing region of the lower box body is up to standard by comparing and calculating the pixel values at each position in the target inspection image and the standard inspection image, which is simple and convenient.

In an embodiment of this application, the inspection system further includes a lifting structure, and after the step of driving, by the drive apparatus, the image acquisition apparatus and the light source to move back to their initial inspection positions, the inspection method includes the steps of:

sending, by the controller, a lifting instruction to the lifting mechanism; and raising, by the lifting mechanism, the lower box body to a preset height so that a tray carrying the lower box body is parallel to a horizontal plane.

Herein, with the provision of the lifting mechanism, all lower box bodies can be lifted to a same height, ensuring an acquisition distance between the image acquisition apparatus and the gluing region, so as to improve the accuracy of image acquisition.

In an embodiment of this application, after the step of raising, by the lifting mechanism, the lower box body to a preset height so that a tray carrying the lower box body is parallel to a horizontal plane, the inspection method further includes:

issuing, by the controller, an inspection instruction to inspect whether the gluing region of the lower box body is at the horizontal plane;

if not, issuing, by the controller, a leveling driving instruction to the drive apparatus; and driving, by the drive apparatus, the image acquisition apparatus to move in the vertical direction while moving in the length direction of the gluing region of the lower box body so that a moving path of the image acquisition apparatus is parallel to the surface of the gluing region and to acquire an inspection image.

Herein, the inspection method can ensure that an acquisition path of the image acquisition apparatus is parallel to the surface of the gluing region, thereby improving the accuracy of the image acquisition.

This application further proposes an inspection method of an inspection system. The inspection system includes a visual inspection apparatus, a server, and a light source, and the inspection method of the inspection system includes the steps of:

receiving a request for inspecting a lower box body, and sending an inspection instruction to a controller so that the controller controls a drive apparatus to drive the image acquisition apparatus and a light source to reciprocate in a length direction of a gluing region of the lower box body and instruct the image acquisition apparatus to acquire an inspection image; and receiving the inspection image for processing and analysis to determine whether the gluing region of the lower box body is up to standard.

The inspection method can implement image acquisition of the entire gluing region of the lower box body, and process and analyze the inspection image to accurately determine whether there are defects such as bubbles, debris, or glue breakage, thereby making a better determination on whether the gluing on the lower box body is acceptable.

In an embodiment of this application, the inspection instruction includes acquiring at least a first image and a second image, and the step of receiving the inspection image for processing and analysis to determine whether the gluing region of the lower box body is up to standard includes:

receiving the first image and the second image sent by the controller, and performing image fusion processing to eliminate image reflection and obtain a target inspection image of the gluing region; and determining whether the gluing region is up to standard based on the target inspection image.

Due to the different positions and emission angles of the first light source and the second light source, positions of the reflective regions of the first image and the second image are different. The image fusion by the server on the two images can eliminate the reflective regions, giving a more realistic and complete inspection image of the gluing region and preventing oversight due to the reflections or the obstruction of the box body. Using such a target inspection image as the basis for determination can obtain a more accurate determination of the gluing condition, improving the inspection accuracy.

In an embodiment of this application, the step of receiving the first image and the second image sent by the controller, and performing image fusion processing to eliminate image reflection and obtain a target inspection image of the gluing region includes:

performing grayscale processing on the first image and the second image to obtain a first grayscale image and a second grayscale image, respectively;

performing binarization processing on the first grayscale image and the second grayscale image to obtain a first binarized grayscale image and a second binarized grayscale image, respectively;

obtaining an intersection region of the first binarized grayscale image and first binarized grayscale image to obtain a non-reflective region;

obtaining a highlighted region and a shadow region of the first image and a highlighted region and a shadow region of the second image through calculation based on the first binarized grayscale image, first binarized grayscale image, and the non-reflective region; and setting, based on respective highlighted regions and shadow regions of the first image and the second image, a preset weight, and superimposing the first image and the second image to obtain the target inspection image.

In this inspection method, the server performs fusion processing on the first image and the second image, and the grayscale processing and the binarization processing can determine the position of each pixel of the first image and the second image, so that when the two images are superimposed, it is more convenient to eliminate the reflective regions and obtain the target inspection image.

In an embodiment of this application, the step of setting, based on respective highlighted regions and shadow regions of the first image and the second image, a preset weight, and superimposing the first image and the second image to obtain the target inspection image includes:

setting a proportion of a shadow region of one of the first image and the second image at a position at which the first image and the second image overlap to x, and a proportion of the shadow region of the other of the first image and the second image at the position at which the first image and the second image overlap to 1-x;

setting a proportion of a highlighted region of one of the first image and the second image to 0 and a proportion of a shadow region of the other of the first image and the second image at a corresponding position to 1; and superimposing the first image and the second image to obtain the target inspection image.

In this method, when the shadow region portions of the two images are superimposed, a ratio of the pixel values of the first image and the second image can be selected to be any value, which makes the superimposition more convenient. The highlighted region of the corresponding first image is completely replaced by the shadow region of the second image, and the highlighted region of the second image is completely replaced by the shadow region of the first image, thereby obtaining a target inspection image with reflections eliminated.

In an embodiment of this application, the step of determining whether the gluing region is up to standard based on the target inspection image includes:

obtaining a standard inspection image and performing a comparison calculation with the target inspection image; and determining that the gluing region is up to standard under the condition that comparison values are consistent.

It is possible to achieve the effect of automatically determining whether the gluing region of the lower box body is up to standard by comparing and calculating the pixel values at each position in the target inspection image and the standard inspection image, which is simple and convenient.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show only some embodiments of this application, and persons of ordinary skill in the art may still derive other drawings from structures shown in these accompanying drawings without creative efforts.

Figure 1:
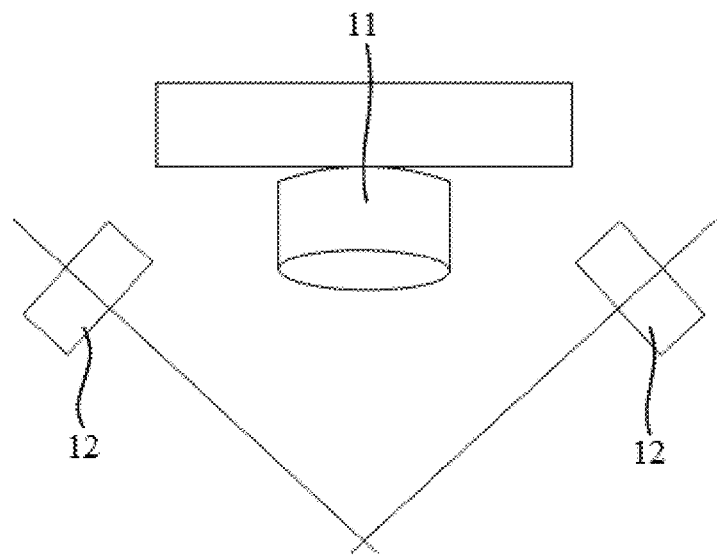
FIG. 1 is a schematic diagram of an embodiment of a visual inspection apparatus according to this application.

Description of reference signs:

| Sign | Name | Sign | Name |
| --- | --- | --- | --- |
| 100 | Inspection system | 222 | Adjustable shelf |
| 10 | Visual inspection apparatus | 30 | First drive module |
| 11 | Image acquisition apparatus | 40 | Second drive module |
| 12 | Light source | 50 | Lifting mechanism |
| 13 | Drive apparatus | 51 | Base |
| 20 | Chassis | 52 | Clamping member |
| 21 | Frame | 60 | Grating gate |
| 211 | Guide rail | 70 | Protective cover |
| 22 | Cross beam | 800 | Gluing region |
| 221 | Slider | | |

The implementation of the purpose, functional features, and advantages of this application will be further described with reference to the embodiments and the accompanying drawings.

DESCRIPTION OF EMBODIMENTS

The following clearly and completely describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

It should be noted that all directional indications (for example, up, down, left, right, forward, back . . . ) in the embodiments of this application are only used to explain the relative positional relationship, movement condition, and the like among the components in a specific attitude (as shown in the accompanying drawings), and that the directional indications also change accordingly if the specific attitude changes.

In the description of the embodiments of this application, unless otherwise specified and limited explicitly, the terms such as "connection" and "fixing" should be understood in their general senses. For example, "fixing" may refer to a fixed connection, a detachable connection, or an integral connection, may refer to a mechanical connection or an electrical connection, and may refer to a direct connection, an indirect connection via an intermediate medium, an internal communication between two elements, or an interaction between two elements, unless specifically defined otherwise. Persons of ordinary skills in the art can understand specific meanings of these terms in this application as appropriate to specific situations.

In addition, the descriptions related to "first", "second", and the like in this application are used for descriptive purposes only, and shall not be understood as any indication or implication of relative importance or any implicit indication of the number of technical features indicated. Therefore, a feature defined by "first" or "second" may explicitly or implicitly include at least one such feature. In addition, "and/or" throughout the document means that it includes three parallel cases. For example, "A and/or B" includes case A, case B, or a case in which both A and B are satisfied. In addition, the technical solutions among the various embodiments may be combined with each other, but such combination must be on the basis that persons of ordinary skill in the art is capable of implementing it. When a combination of the technical solutions results in contradictions or impossibilities, it should be considered that this combination of the technical solutions does not exist and is not within the scope of protection claimed in this application.

The batteries mentioned in the art can be classified into primary batteries and rechargeable batteries based on whether the batteries are rechargeable. Currently, common types of rechargeable batteries include: lead-acid battery, nickel-hydrogen battery, and lithium-ion battery. At present, lithium-ion batteries are widely used in battery electric vehicles and hybrid electric vehicles. The lithium-ion batteries used for this purpose have a relatively low capacity but a relatively large output and charging current, and a relatively long service life, although the cost is relatively high.

The batteries described in the embodiments of this application refer to rechargeable batteries. The following mainly uses the lithium-ion battery as an example to describe the embodiments disclosed in this application. It should be understood that the embodiments disclosed in this application are applicable to any other suitable type of rechargeable battery. The batteries mentioned in the embodiments disclosed in this application may be directly or indirectly applied to an appropriate apparatus to power the apparatus.

The battery mentioned in the embodiments disclosed in this application is a single physical module that includes one or more battery cells for providing a predetermined voltage and capacity. A battery cell is a basic unit in a battery and includes a positive electrode plate, a negative electrode plate, an electrolyte, and a separator. Working of the lithium-ion battery cell mainly relies on migration of lithium ions between the positive electrode plate and the negative electrode plate. Generally according to the way of packaging, battery cells can be divided into: cylindrical battery cell, prismatic battery cell, and soft pouch battery cell. The following will mainly focus on the prismatic battery cell. It should be appreciated that the embodiments described below are also applicable to the cylindrical battery cell or soft pouch battery cell in some aspects.

For the development of battery technologies, various design factors need to be considered, for example, performance parameters such as energy density, cycle life, discharge capacity, and charge and discharge rate. In the battery manufacturing process, generally, a complete battery is made before the battery has gone through a number of processes and work stations to complete the production and measurement. First, the positive electrode plate, negative electrode plate, electrolyte, and separator are made into the form of a cell, and then processes such as packaging, welding, and formation are carried out to form a battery cell. A plurality of battery cells are then arranged side by side to form a battery module, and the battery modules are loaded into a box to form a battery pack. Alternatively, a plurality of battery cells can be directly loaded into the box to form a battery pack structure.

To enable the battery modules in the box to have a relatively stable structure, generally a layer of colloid is first applied on the bottom wall of the inner cavity of the lower box body, and then the battery modules are placed in and firmly connected to the lower box body through the colloid. A larger amount of glue applied may lead to waste and deterioration of thermal conductivity, and a less amount of glue applied affects the structural strength of the battery pack, leading to movement of battery modules in the battery pack, which will cause great harm to the safety of the vehicle. Therefore, the gluing process is very important.

At present, with the development of technology, requirements for gluing quality control on the lower box body have gradually risen, and the monitoring of bubbles and foreign matter on the glued surface has become more precise. Traditional inspection methods involve manual judgment or retrospective analysis using images stored in an ordinary camera. The manual judgment method has problems such as oversight and misplacements caused by human factors. The retrospective analysis using images stored in the camera may also have problems such as the inability to capture certain regions due to different angles and the possibility of oversight caused by improper human intervention during image inspection. Therefore, both methods are becoming increasingly inadequate in meeting the market demands of customers. At present, automated colloid inspection is also used. For example, scanning is typically performed with a line array laser sensor while the glue is being applied, so as to determine a gluing position and whether there is glue breakage or shortage of glue. However, the line array laser sensors can only implement inspection for small cross-sectional adhesive strips, and cannot satisfy the requirements for large-surface gluing inspection.

Therefore, to solve the problems in the related art, this application proposes a visual inspection apparatus including an image acquisition apparatus, a drive apparatus, and a controller. The controller automatically controls the operation of the drive apparatus and drives the image acquisition apparatus to move from one side in the length direction of the gluing region to the opposite side. In this way, a complete view of the overall morphology of the gluing region can be obtained without oversight, and observation of whether foreign matter and bubbles are present can be carried out in a macroscopic manner, improving the inspection effect.

Referring to FIG. 1, in an embodiment of this application, the visual inspection apparatus 10 proposed in this application includes an image acquisition apparatus 11, a drive apparatus 13, and a controller. The drive apparatus 13 is drivingly connected to the image acquisition apparatus 11 for driving the image acquisition apparatus 11 to reciprocate in a length direction of a gluing region 800 of a lower box body and acquire an inspection image of the entire gluing region 800. The controller is electrically connected to the image acquisition apparatus 11 and drive apparatus 13 to control the acquisition of the image acquisition apparatus 11 and the operation of the drive apparatus 13.

The visual inspection apparatus 10 includes a controller, an image acquisition apparatus 11, and a drive apparatus 13. The image acquisition apparatus 11 may be a line scan camera, an area scan camera, or the like, which is not limited herein, as long as it can acquire images of the gluing region 800 during movement. The drive apparatus 13 may use a drive member to drive a transmission member, so as to drive the image acquisition apparatus 11 to reciprocate in a straight line, or directly drive the image acquisition apparatus 11 to move, and the drive member may be a motor, a cylinder, or the like, which is not limited herein. Under the control of the controller, the drive apparatus 13 can drive the image acquisition apparatus 11 to reciprocate in a length direction of the gluing region 800 so that the image acquisition apparatus 11 can obtain an inspection image of an overall structure of the gluing region 800, allowing for a more macroscopic observation of overall gluing conditions of the gluing region 800, which helps to better determine whether the gluing is acceptable.

The visual inspection apparatus 10 can macroscopically acquire an overall appearance of the gluing region 800, which facilitates the inspection of whether there are defects such as bubbles, debris, or glue breakage in the gluing region 800, thereby making a better determination on whether the gluing on the lower box body is acceptable.

Figure 2:
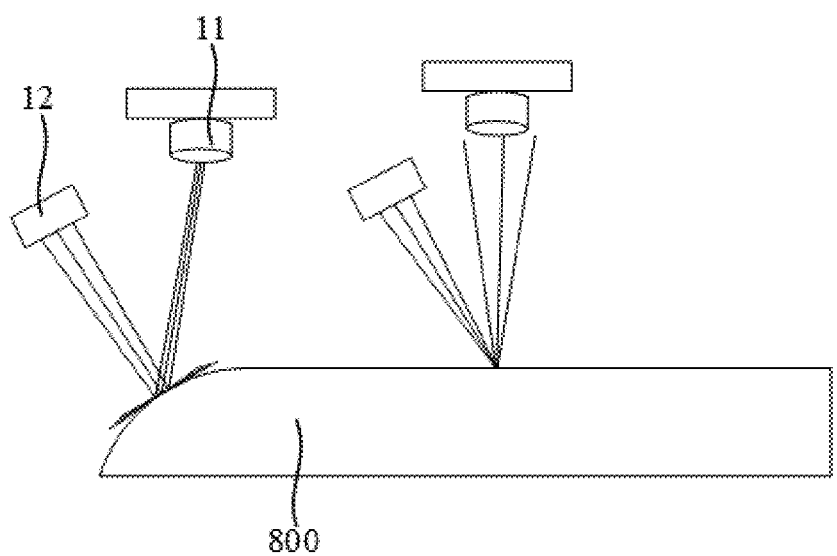
FIG. 2 is a schematic diagram of an optical path during an inspection process for a visual inspection apparatus according to this application.

Referring to FIG. 1 and FIG. 2, in an embodiment of this application, the visual inspection apparatus 10 further includes a light source 12. The light source 12 is disposed on one side of the image acquisition apparatus 11 and electrically connected to the controller, and the light source 12 is configured to emit light toward the gluing region 800.

The light source 12 may be a linear light source 12 or a matrix point light source 12, which is not limited herein. The light source 12 being disposed on one side of the image acquisition apparatus 11 means that the light source 12 is located on one side of the image acquisition apparatus 11 in the horizontal direction and at different heights. For example, the light source 12 is located on the lower side of the image acquisition apparatus 11 so that it can emit light towards the gluing region 800, supplementing light for the image acquisition apparatus 11. The light source 12 may be mounted individually or on the mounting structure of the image acquisition apparatus 11 as an integral structure. Herein, with the provision of the light source 12, it is possible to provide better acquisition light for the image acquisition apparatus 11, improving the image acquisition effect.

In an embodiment of this application, the image acquisition apparatus 11 includes a line scan camera; and/or the light source 12 includes a linear light source 12.

The line scan camera is only capable of capturing a line of pixels with a width of 1 pixel and completes the acquisition of a two-dimensional image of the gluing region 800 during the movement under the drive of the drive apparatus 13. The line scan camera has a higher resolution and better imaging effect, thereby further improving the effect of image acquisition. With a specific width adapted to the width of the gluing region 800, the line scan camera can move along the length direction of the gluing region 800 to obtain a complete image of the gluing region 800, avoiding occurrence of oversight.

In an example, a color line scan camera may be selected, capable of obtaining color information of the gluing region 800, thereby quantifying the color information of the glue. when an AB adhesive is used for mixed gluing, it is possible to determine whether a gluing ratio in a region of the gluing region 800 is appropriate by comparing the inspection images. Certainly, when the line scan camera is of the black-and-white type, it is also possible to determine whether there are defects such as bubbles and foreign matter in the gluing region 800 based on the lightness and darkness of the inspection images.

No matter whether the image acquisition apparatus 11 is set as a line scan camera or not, the light source 12 is selected as a linear light source 12. The linear light source 12 utilizes high-power, high-brightness LEDs to form a high-intensity, high-uniformity light strip through special lenses. The linear light source 12 has good consistency and uniformity, and its illumination length can be designed according to the width of the gluing region 800 to match with the line scan camera, which can make the acquired inspection images clearer and more complete.

In an embodiment of this application, the light source 12 includes a first light source 12 and a second light source 12. The first light source 12 is disposed on one side of the image acquisition apparatus 11 in a moving direction, the second light source 12 is disposed on the other side of the image acquisition apparatus 11 in the moving direction, and the first light source 12 and the second light source 12 have different emission angles.

Herein, the first light source 12 and the second light source 12 may both be selected as the type of linear light source 12 and are located on opposite sides to the image acquisition apparatus 11, where the first light source 12 is disposed on one side of the image acquisition apparatus 11 in the moving direction, that is, on one side close to the gluing region 800 in the length direction, and the second light source 12 is on the other side of the image acquisition apparatus 11 in the moving direction, that is, on the other side close to the gluing region 800 in the length direction. The first light source 12 and the second light source 12 have different light emission directions, and in one example, the emission axes of the two light sources are both inclined with respect to a direction towards the image acquisition apparatus 11 so that illumination at different positions of the gluing region 800 can be implemented, improving the quality of images acquired.

At least one of the first light source 12 and the second light source 12 can be selected for supplementary lighting, so that supplementary lighting can be provided from different directions to obtain at least two images with reflections at different positions, thereby providing more effective inspection images for subsequent determination to prevent occurrence of oversight.

In an embodiment of this application, the controller is further configured to: turn on the first light source 12 and control the image acquisition apparatus 11 to move from one side in the length direction of the gluing region 800 to the other side opposite thereto; and turn on the second light source 12 and control the image acquisition apparatus 11 to move from the other side in the length direction of the gluing region 800 to the side opposite thereto.

Taking a long side of the gluing region 800 as a reference, for example, the first light source 12 is close to the left side of the gluing region 800 in the length direction and the second light source 12 is close to the right side of the gluing region 800. The controller controls the image acquisition apparatus 11 to move from the left side of the gluing region 800 to the right side and acquire a first image while controlling the first light source 12 to turn on, and controls the image acquisition apparatus 11 to move from the right side of the gluing region 800 to the left side and acquire a second image while controlling the second light source 12 to turn on. This structure implements automatic acquisition of at least two images with different reflective positions, improving inspection efficiency.

In an embodiment of this application, the light source 12 is movably disposed relative to the image acquisition apparatus 11 to adjust the emission angle of the light source 12 relative to a horizontal plane; and/or an included angle between the emission angle of the light source 12 and the axis of the image acquisition apparatus 11 is in a range of greater than or equal to 30° to less than or equal to 60°.

In an example, the image acquisition apparatus 11 is mounted on a fixed frame and disposed towards the gluing region 800, and the light source 12 is mounted on an adjustable shelf 222 and is disposed towards the gluing region 800. The adjustable shelf 222 is movably mounted to the fixed frame so as to adjust the angle of the light source 12 with respect to the image acquisition apparatus 11, that is, to adjust the emission angle of the light source 12 with respect to the horizontal plane. In an optional example, a plurality of adjustment holes are formed at both ends of the adjustable shelf 222. The plurality of adjustment holes are arranged in an arc, and the fixed frame is provided with fixed holes. With threaded connections through the fixed holes and different adjustment holes, the tilt angle of the adjustable shelf 222 with respect to the horizontal plane changes, which means that the emission angle of the light source 12 changes. In other examples, the adjustable shelf 222 and the fixed frame may alternatively be shaft-hole fitted, with the rotation angle limited by another locking fastener.

Herein, the emission angle of the light source 12 relative to the horizontal plane can be adjusted so that changes can be made according to different types and sizes of the lower box body, thereby obtaining more accurate inspection images.

The included angle between the emission angle of the light source 12 and the axis of the image acquisition apparatus 11 should not be too large or too small; otherwise there will be less or even no light reflected into the image acquisition apparatus 11, resulting in ineffective supplementary lighting. Therefore, in an example, the included angle between the emission angle of the light source 12 and the axis of the image acquisition apparatus 11 is set to be greater than or equal to 30° and less than or equal to 60°, for example, 30°, 35°, 40°, 45°, and the like, which can further facilitate assisting the image acquisition apparatus 11 to obtain a more realistic and clear inspection image.

Figure 3:
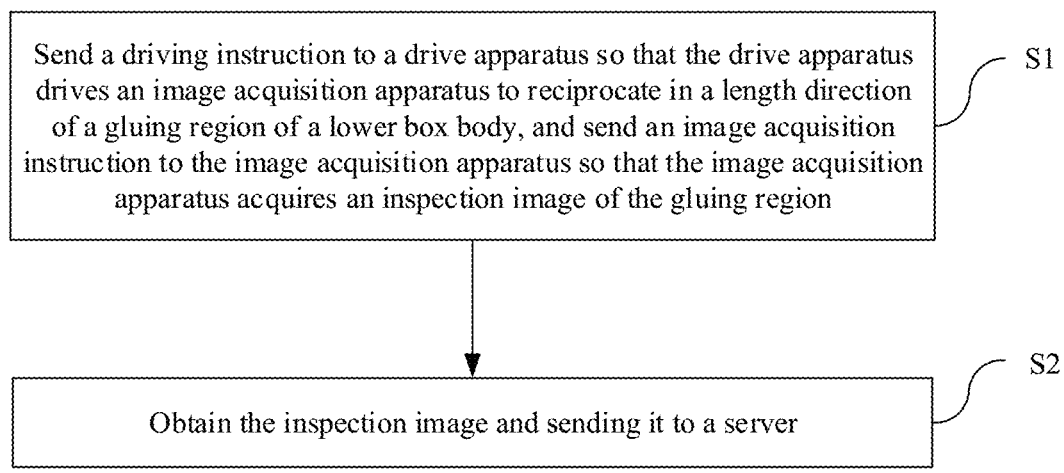
FIG. 3 is a flowchart of an embodiment of an inspection method of a visual inspection apparatus according to this application.

Referring to FIG. 3, this application further provides an inspection method of a visual inspection apparatus, the visual inspection apparatus including a drive apparatus, an image acquisition apparatus, and a controller. The inspection method includes the steps of:

step S1: sending a driving instruction to the drive apparatus so that the drive apparatus drives the image acquisition apparatus to reciprocate in a length direction of a gluing region of a lower box body, and sending an image acquisition instruction to the image acquisition apparatus so that the image acquisition apparatus acquires an inspection image of the gluing region; and step S2: obtaining the inspection image and sending it to a server.

In this inspection method, in step S1, the controller, that is, a lower computer, sends both a driving instruction and an image acquisition instruction to cause the drive apparatus to drive the image acquisition apparatus to move in the length direction of the gluing region, and acquires an image. The width of the image acquisition apparatus is set to match the width of the gluing region so that a morphology image of the overall gluing region can be obtained by scanning the gluing region in one go under the drive of the drive apparatus. In step S2, the controller may send an instruction to obtain an inspection image from the image acquisition apparatus and send it to a server for analysis and judgment processing. Optionally, the controller may also store the inspection image in a local disk.

It is possible to control the drive apparatus and the image acquisition apparatus to achieve the effect of automatically acquiring the inspection image of the overall topography of the gluing region, so that defects in the gluing region can be conveniently determined in a macroscopic manner, for example, detection of bubbles and foreign matter, reducing the risk of oversight.

Figure 4:
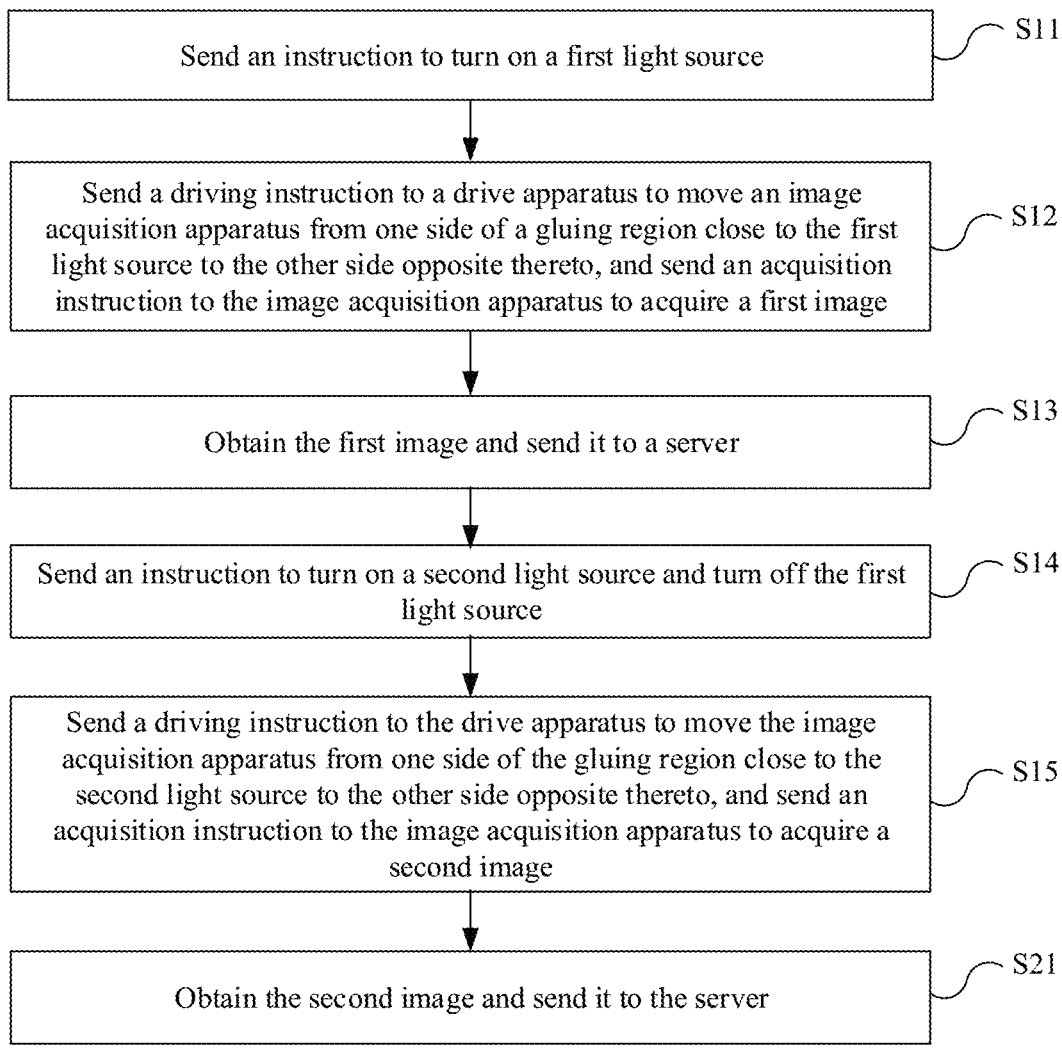
FIG. 4 is a flowchart of another embodiment of an inspection method of a visual inspection apparatus according to this application.

Referring to FIG. 4, in an embodiment of this application, the visual inspection apparatus includes a first light source and a second light source. The first light source is disposed on one side of the image acquisition apparatus in a moving direction, the second light source is disposed on the other side of the image acquisition apparatus in the moving direction, and the first light source and the second light source have different emission angles. The inspection method of the visual inspection apparatus includes:

step S11: sending an instruction to turn on the first light source;

step S12: sending a driving instruction to the drive apparatus to move the image acquisition apparatus from one side of the gluing region close to the first light source to the other side opposite thereto, and sending an acquisition instruction to the image acquisition apparatus to acquire a first image;

step S13: obtaining the first image and send it to a server;

step S14: sending an instruction to turn on the second light source and turn off the first light source;

step S15: sending a driving instruction to the drive apparatus to move the image acquisition apparatus from one side of the gluing region close to the second light source to the other side opposite thereto, and sending an acquisition instruction to the image acquisition apparatus to acquire a second image; and step S16: obtaining the second image and send it to the server.

Taking a long side of the gluing region as a reference, for example, the first light source is close to the left side of the gluing region in the length direction and the second light source is close to the right side of the gluing region. The controller controls the image acquisition apparatus to move from the left side of the gluing region to the right side and acquire a first image while controlling the first light source to turn on, and controls the image acquisition apparatus to move from the right side of the gluing region to the left side and acquire a second image while controlling the second light source to turn on. In the inspection method, a first image having a reflective region can be obtained with the cooperation of the first light source and the drive apparatus, and a second image having a reflective region can be obtained with the cooperation of the second light source and the drive apparatus, so that the automatic acquisition of at least two images with different reflective positions is implemented, improving inspection efficiency. Due to the different positions and emission angles of the first light source and the second light source, positions of the reflective regions of the first image and the second image are different. Therefore, a more realistic and complete inspection image of the gluing region can be obtained after the two images are combined, preventing oversight due to the reflections or the obstruction of the box body and providing the server with better image data. The inspection method can improve the inspection accuracy.

Figure 5:
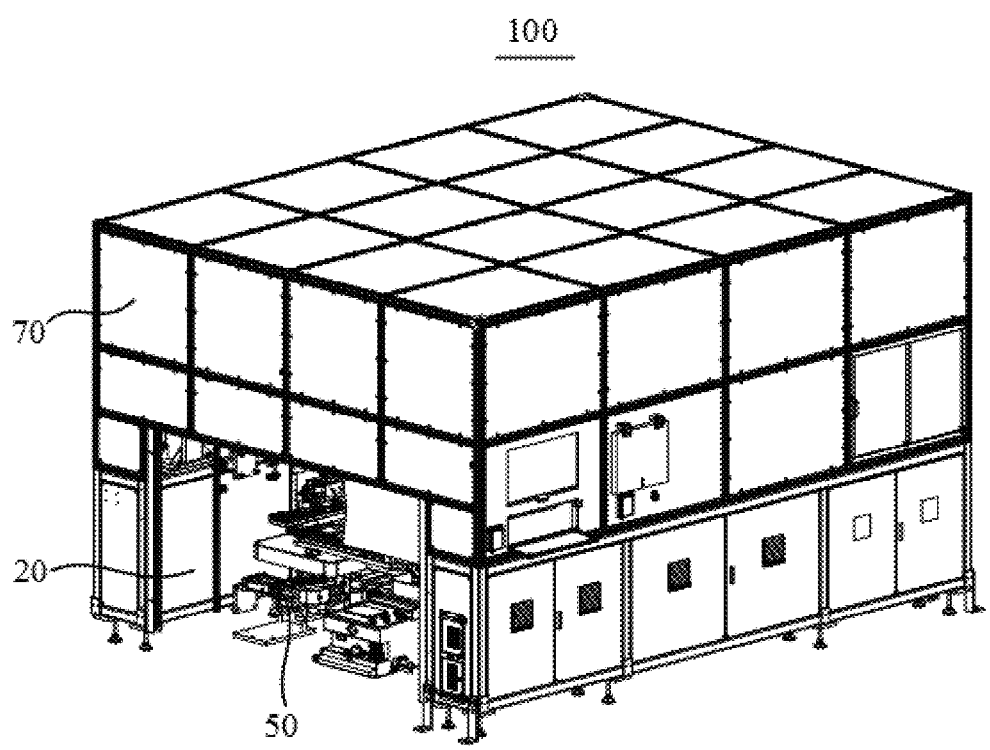
FIG. 5 is a schematic structural diagram of an inspection system according to this application.
Figure 6:
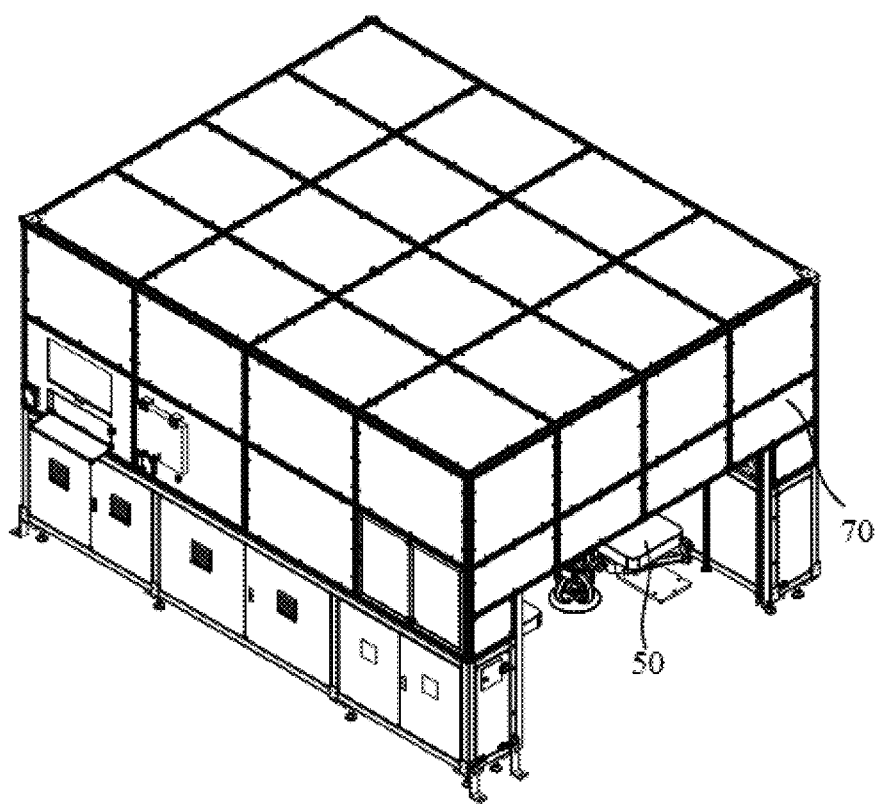
FIG. 6 is a schematic structural diagram of the inspection system shown in FIG. 5 from another perspective.
Figure 7:
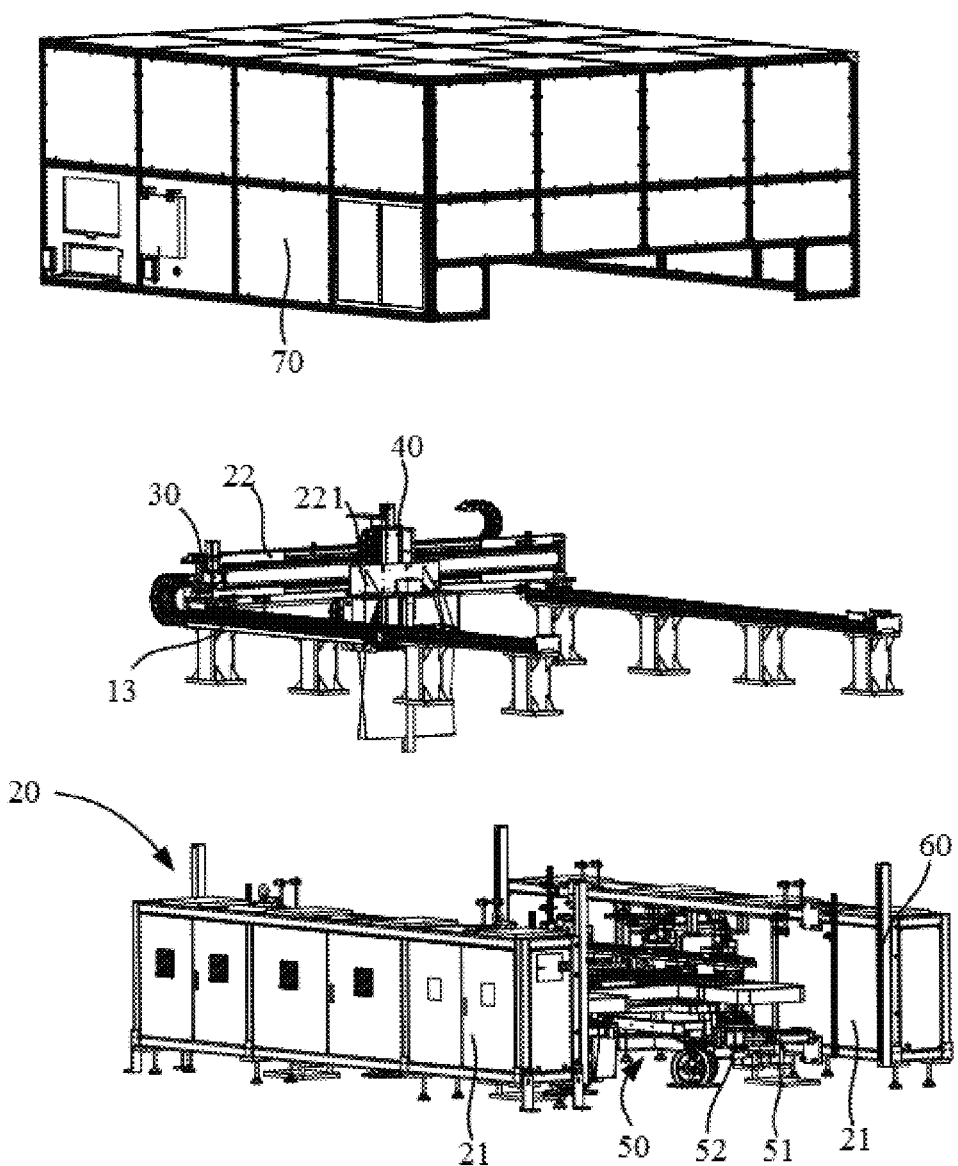
FIG. 7 is an exploded view of the inspection system shown in FIG. 6.

Referring to FIG. 5 to FIG. 7, this application further proposes an inspection system 100 including a visual inspection apparatus 10 and a server. The visual inspection apparatus 10 is the visual inspection apparatus 10 as described above; and the server is electrically connected to the controller and configured to receive and determine whether the gluing region 800 is up to standard based on the inspection image. The visual inspection apparatus 10 of the inspection system adopts all the technical solutions of all the foregoing embodiments and therefore has at least all the beneficial effects brought by the technical solutions of the foregoing embodiments. Details are not repeated herein.

The visual inspection apparatus 10 can macroscopically acquire an overall appearance of the gluing region 800, and the server can make a more accurate determination based on the inspection image, improving the accuracy in the inspection of the gluing condition of the gluing region 800. Use of the inspection image obtained by the visual inspection apparatus 10 can facilitate the inspection of whether there are defects such as bubbles, debris, or glue breakage in the gluing region 800, thereby making a better determination on whether the gluing on the lower box body is acceptable.

Figure 8:
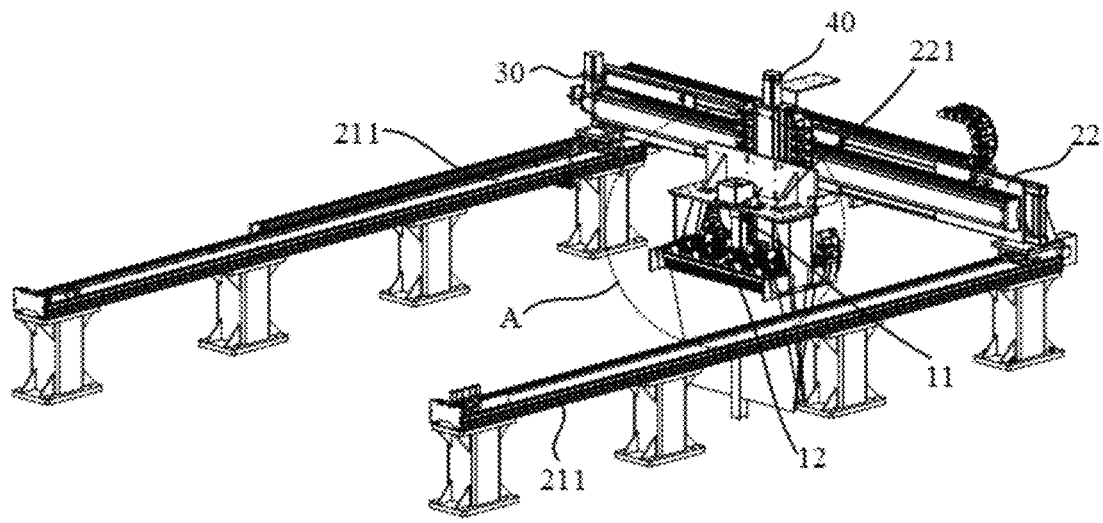
FIG. 8 is a schematic structural diagram of the inspection system in FIG. 7 with a protective cover and frames removed.

Referring to FIG. 7 and FIG. 8, in an embodiment of this application, the inspection system 100 further includes a chassis 20. The chassis 20 includes two frames 21 disposed oppositely and a cross beam 22 slidably connected to the two frames 21, and a lower box body is accommodated between the two frames 21.

A drive apparatus 13 of the visual inspection apparatus 10 is mounted on the frames 21 and drivingly connected to the cross beam 22. The image acquisition apparatus 11 is disposed on the cross beam 22 and positioned above a gluing region 800 of the lower box body to reciprocate in a length direction of the gluing region 800 under the drive of the drive apparatus 13.

In an example, the two frames 21 are provided in a rectangular structure with a length direction and a width direction. The periphery and upper surface of the frame 21 may be connected with panels so as to form a cabinet structure, which can accommodate some electronic control devices and circuits, thereby making the inspection system 100 more organized. Optionally, the bottom of the frame 21 is connected with support legs to facilitate adjustment of the height of the frame 21 and help move and support the frame 21. The cross beam 22 is a rectangular structure and its length direction is the width direction of the frame 21, so that two ends of the cross beam 22 are slidably connected to the upper surfaces of the two frames 21. The image acquisition apparatus 11 is mounted on the cross beam 22 and may be disposed in the middle of the cross beam 22 as required, and the lower box body is disposed between the two frames 21 and corresponds to the image acquisition apparatus 11, so as to facilitate the acquisition of an image of the complete gluing region 800. The drive apparatus 13 may be provided in one or two, mounted on the frame 21, and drivingly connected to the cross beam 22, so that the cross beam 22 can be driven to move in the length direction of the frame 21, where the length direction of the gluing region 800 of the lower box body is consistent with the length direction of the frame 21, and drive the image acquisition apparatus 11 to move in the length direction of the gluing region 800, so that acquisition of the image can be implemented in one go. In other examples, the image acquisition apparatus 11 may alternatively be driven to move in the width direction of the gluing region 800 to acquire partial images and then perform scanning once to complete the acquisition of the entire image.

Herein, the frame 21 provides a mounting base for the drive apparatus 13 and limits the lower box body to form a safe inspection environment. With the provision of the cross beam 22, it is possible to provide a more stable movement support for the image acquisition apparatus 11, so that the moving direction of the image acquisition apparatus 11 can be better maintained consistent with the length direction of the gluing region 800 of the lower box body, improving the precision of acquisition.

In an example, the drive apparatus 13 may include a drive member and a transmission member. The drive member is a motor, and the transmission member may be a screw rod and a slider 221. For example, a screw rod is provided on the frame 21, and a nut slider 221 is provided at both ends of the cross beam 22 that cooperates with the screw rod, so that the screw rod rotates under the drive of the motor, causing the nut slider 221 to move horizontally. Alternatively, a belt is provided, and a motor is used to drive the belt to run, thereby driving the image acquisition apparatus 11 to move. In addition, a guide rail 211 is also provided on the upper surface of the frame 21 so that the movement of the image acquisition apparatus 11 is more stable. A cable carrier is also provided above the frame 21. The cable carrier can provide traction and protection for the cables of the devices on the cross beam 22. Optionally, a pillar is also provided above the frame 21. The transmission member and the cable carrier are provided on the pillar, and the drive member is disposed on the frame 21, so as to realize better driving.

Figure 9:
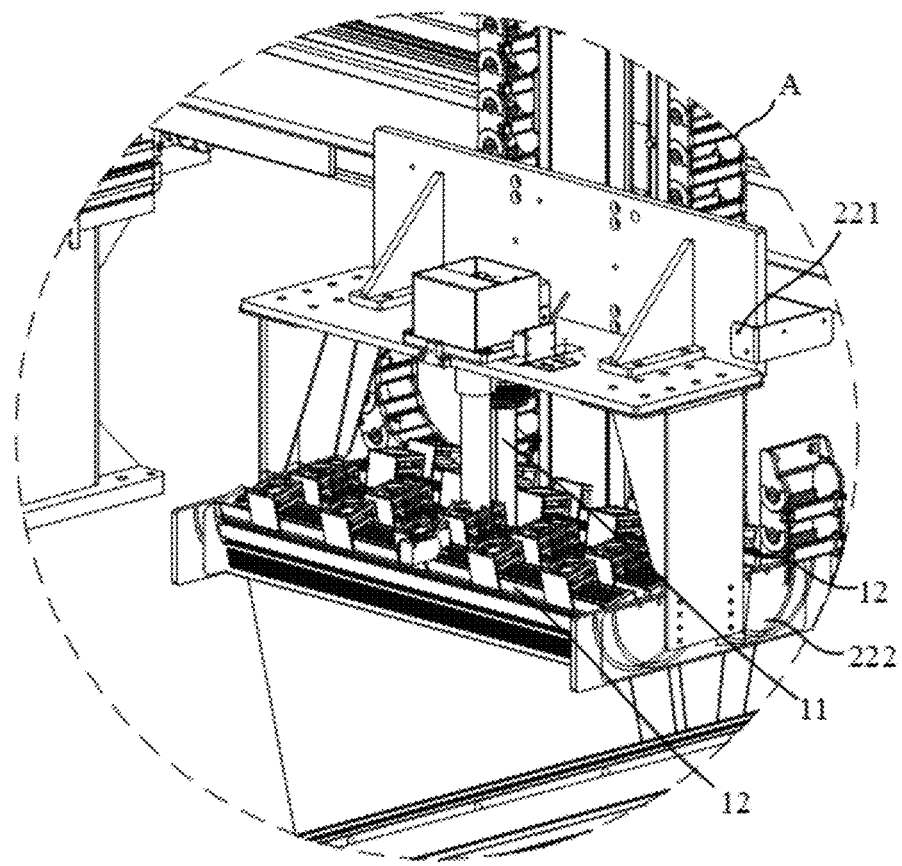
FIG. 9 is an enlarged view of position A in FIG. 8.

Referring to FIG. 8 and FIG. 9. In an embodiment of this application, the inspection system 100 further includes a first drive module 30 and a light source 12. The light source 12 is disposed on one side of the image acquisition apparatus 11, and the first drive module 30 is disposed on the cross beam 22 and drivingly connected to the image acquisition apparatus 11 and the light source 12 for driving the image acquisition apparatus 11 and the light source 12 to reciprocate in a width direction of the gluing region 800.

Herein, the light source 12 may be of the type referred to in the above embodiments. The light source 12 is disposed on one side of the image acquisition apparatus 11, for example, the light source 12 being located on the lower side of the image acquisition apparatus 11, and emits light to the gluing region 800. With the provision of the light source 12, it is possible to provide supplementary lighting for the image acquisition apparatus 11, thereby improving the effect of acquiring the inspection image. In addition, with the provision of the first drive module 30, it is possible to make the image acquisition apparatus 11 to reciprocate in the width direction of the gluing region 800. For example, a lower box body with a non-standard size has a relatively large width value, and the image acquisition apparatus 11 has a specific acquisition field of view. The image acquisition apparatus 11 moves in the length direction of the gluing region 800 to acquire half of an image, and moves in the width direction to the other half of the gluing region 800, and then moves in the length direction of the gluing region 800, so as to acquire a complete image. With the provision of such a structure, the image acquisition apparatus 11 and the light source 12 can match lower box bodies with different width sizes, so as to carry out image acquisition of the entire gluing region 800 and improve adaptability.

In an example, the first drive module 30 includes a first drive motor and a transmission member. The first drive motor is mounted on the cross beam 22, and the transmission member is a first screw rod and a first nut slider 221. The image acquisition apparatus 11 and the light source 12 are mounted on the first nut slider 221, and the drive member drives the image acquisition apparatus 11 to move horizontally relative to the cross beam 22. Optionally, a cable carrier is also provided on the cross beam 22 so as to provide traction and protection for cables when devices move on the cross beam 22.

In an embodiment of this application, the inspection system 100 further includes a second drive module 40, the cross beam 22 is fitted with a slider 221, the first drive module 30 is drivingly connected to the slider 221. The second drive module 40 is mounted on the slider 221 and drivingly connected to the image acquisition apparatus 11 and the light source 12 for driving the image acquisition apparatus 11 and the light source 12 to reciprocate in a thickness direction of the gluing region 800.

The second drive module 40 includes a second drive motor. The second drive motor is disposed on a first nut slider 221 and drivingly connected to a fixed frame, and the image acquisition apparatus 11 is mounted on the fixed frame so as to reciprocate under the drive of the second drive motor. The light source 12 is mounted on an adjustable shelf

222. The adjustable shelf 222 is movably disposed relative to the fixed frame to adjust the emission angle of the light source 12, thereby matching the gluing region 800 of the lower box bodies of different sizes.

With the provision of the second drive module 40, the image acquisition apparatus 11 can be driven to move in the thickness direction so as to adapt to a situation in which the gluing region 800 is not in the same plane, which further improves the accuracy of inspection image acquisition and the adaptability of the inspection system 100.

Referring to FIG. 7, in an embodiment of this application, the inspection system 100 further includes a lifting mechanism 50. The lifting mechanism 50 is disposed between the two frames 21 and drivingly connected to the lower box body for driving the lower box body to reciprocate in a vertical direction.

In an example, the lifting mechanism 50 is disposed between the two frames 21 and can lift and lower a lower box body of an incoming material in the vertical direction. The lifting mechanism 50 is not limited in type, may implement a vertical drive using a drive cylinder or a vertical movement of the lower box body under the drive of a motor. Herein, with the provision of the lifting mechanism 50, all lower box bodies can be lifted to a same height, so that lower box bodies with different height sizes can be matched, ensuring an acquisition distance between the image acquisition apparatus 11 and the gluing region 800, so as to improve the accuracy of image acquisition.

In an embodiment of this application, the lifting mechanism 50 includes a base 51, a lifting assembly disposed in the base 51, and two clamping members 52 disposed oppositely. The two clamping members 52 are capable of moving towards or away from each other to clamp or release the lower box body, and the lifting assembly is drivingly connected to the clamping members 52 for driving the clamping members 52 up or down.

In an example, the lifting mechanism 50 includes a base 51. The base 51 may include support columns and footings, thereby achieving the effect of stable support and a mounting base. The lifting assembly may include a lifting drive member and a lifting platform drivingly connected thereto. The lifting drive member is mounted on the base 51, and the clamping members 52 are connected to the lifting platform so as to move vertically under the drive of the driving platform. With the lower box body placed on the lifting platform and clamped by the clamping members 52, the stability of the lower box body can be effectively improved. The clamping member 52 can be a clamping cylinder, which means that a cylinder is drivingly connected to a clamping plate to implement the clamping of the lower box body. The clamping members 52 are provided to fix the lower box body, making it more stable during the lifting process and preventing it from falling.

In another example, two lifting mechanisms 50 may be provided, and the clamping members 52 are respectively clamped around the lower box body, thereby further enhancing the stability of the lower box body during the lifting process.

In an embodiment of this application, the server is configured to send an inspection instruction to the controller to instruct the image acquisition apparatus 11 to acquire at least two inspection images.

The server is further configured to: obtain at least two inspection images, perform image fusion on the at least two inspection images to eliminate image reflection, and determine whether the gluing region 800 is up to standard.

The server, also known as a host computer, determines needs based on inspection and issues different inspection schemes. Herein, since the images acquired by the image acquisition apparatus 11 with the cooperation of the light source 12 have different degrees of reflection, to improve the quality of the inspection images, the server, when issuing an inspection instruction to the controller, sends an instruction for acquiring the at least two inspection images. The controller obtains the first image and the second image according to the foregoing method of acquiring the first image and the second image by the visual inspection apparatus 10. The server performs fusion on the two inspection images, that is, the first image and the second image, to eliminate the reflections, so as to improve the authenticity and validity of the inspection image. The server can make a more accurate determination based on the inspection image, improving the accuracy in the inspection of the gluing condition of the gluing region 800.

Still referring to FIG. 7, in an embodiment of this application, the inspection system 100 further includes two grating gates 60, an inspection channel is formed between the two frames 21, an extension direction of the inspection channel is consistent with the length direction of the gluing region 800, and the inspection channel has an entrance and an exit disposed oppositely. One of the grating gates 60 is disposed at the entrance of the inspection channel, and the other one of the grating gates 60 is disposed at the exit of the inspection channel.

The grating gate 60 includes a transmit end and a receive end disposed oppositely. If infrared rays sent through the transmit end are received by the receive end, it indicates that a normal signal can be sent; and if the receive end does not receive the light, it indicates the presence of an obstacle, and a signal indicating the presence of an obstacle can be sent. Two frames 21 form an entrance and an exit in a space in the width direction. An inspection channel formed by the frames 21 and having openings at two ends can facilitate the entry and exit of a trolley transporting the lower box body, and the provision of the grating gates 60 at the entrance and exit can protect the inspection in the inspection channel from external interference, improving the inspection safety. In an example, a receive end of a grating gate 60 is mounted at an entrance end of one of the frames 21, and a receive end is mounted at an entrance end opposite the other frame 21. A receive end of the other grating gate 60 is amounted at an exit end of one of the frames 21, and a receive end is mounted at an exit end opposite the other frame 21.

In an embodiment of this application, the inspection system 100 includes home sensors and limit sensors. The home sensors are disposed at initial positions of the image acquisition apparatus 11 and the light source 12, and the limit sensors are disposed at moving paths of the image acquisition apparatus 11 and the light source 12.

The home sensor may be disposed at the end of the frame 21 close to the entrance, and each time an inspection starts, the image acquisition apparatus 11 is first controlled to return to the position of the home sensor. The type of home sensor may be a displacement sensor. With the provision of the home sensors, it is possible to accurately reset the image acquisition apparatus 11 and the light source 12, so that a reset check can be performed for each inspection to calibrate the inspection system 100, improving the inspection accuracy. The limit sensor may be disposed according to the size of the lower box body. With the provision of the limit sensors, it is possible to detect whether the image acquisition apparatus 11 moving in the moving direction has reached an intended position, improving self-check performance of the inspection system 100.

In an example, the inspection system 100 further includes a protective cover 70 that is placed on the top of the frame 21 and covers the cross beam 22 and the image acquisition apparatus 11, thereby forming a protective space that helps to prevent external interference and improves the accuracy and efficiency of the inspection.

Figure 10:
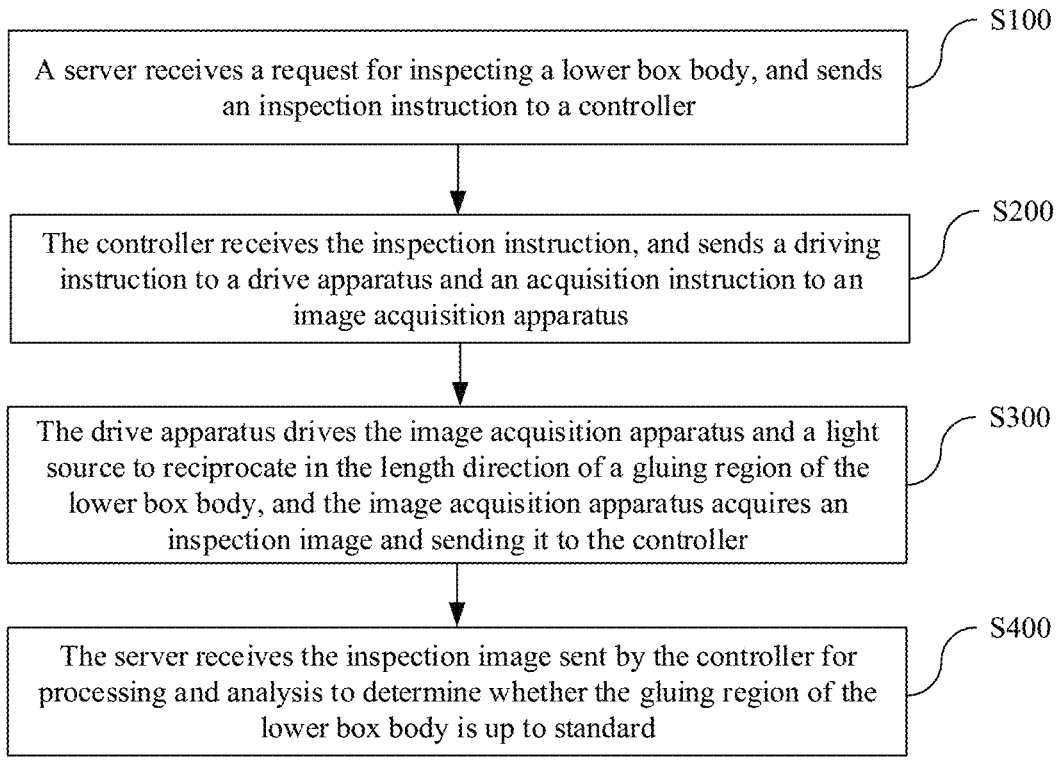
FIG. 10 is a flowchart of a first embodiment of an inspection method of an inspection system according to this application.

Referring to FIG. 10, this application further proposes an inspection method of an inspection system. The inspection system includes a visual inspection apparatus, a server, and a light source, and the inspection method of the inspection system includes the steps of:

step S100: receiving, by the server, a request for inspecting a lower box body, and sending an inspection instruction to a controller;

step S200: receiving, by the controller, the inspection instruction, and sending a driving instruction to a drive apparatus and an acquisition instruction to an image acquisition apparatus;

step S300: driving, by the drive apparatus, the image acquisition apparatus and the light source to reciprocate in the length direction of a gluing region of the lower box body, and acquiring, by the image acquisition apparatus, an inspection image and sending it to the controller; and step S400: receiving, by the server, the inspection image sent by the controller for processing and analysis to determine whether the gluing region of the lower box body is up to standard.

In step S100 of the foregoing method, when the lower box body is ready to enter the inspection channel, an inspection request can be sent to the server. The server confirms, according to the inspection environment, that the inspection can be carried out, and may choose to enable the grating gate at the entrance so that the trolley carrying the lower box body enters the inspection channel. The controller in step S200 controls the drive apparatus and the image acquisition apparatus to operate according to the inspection instruction to acquire an inspection image. The drive apparatus in step S300 drives the image acquisition apparatus to implement image acquisition of the gluing region, and the movement in this step is in the length direction. In other examples, the movement in the width direction may also be performed according to the size and shape of the gluing region. In step S400, after receiving the inspection image, the server performs a series of processing and analysis thereon. For example, coordinates of the inspection image are quantified so as to compare with a standard image. If the coordinate position of each pixel is the same, it means that the gluing position of the gluing region is up to standard; otherwise, the gluing position of the gluing region is not up to standard. Alternatively, the inspection image is grayscaled so as to determine whether there are obvious dark or bright spots, so as to detect defects such as bubbles or debris.

The inspection method can implement image acquisition of the entire gluing region of the lower box body, and process and analyze the inspection image to accurately determine whether there are defects such as bubbles, debris, or glue breakage, thereby making a better determination on whether the gluing on the lower box body is acceptable.

Figure 11:
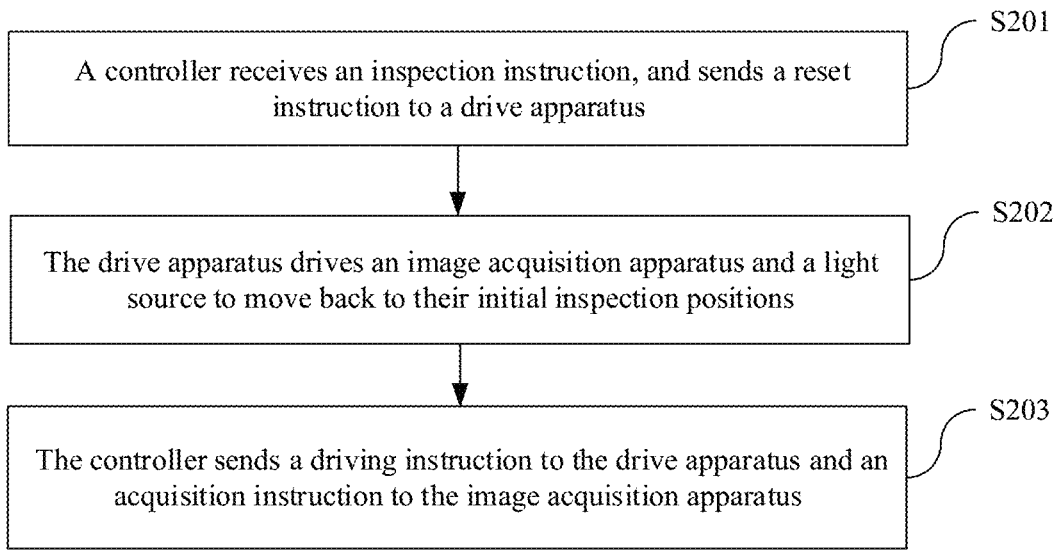
FIG. 11 is a flowchart of a second embodiment of an inspection method of an inspection system according to this application.

Referring to FIG. 11, in an embodiment of this application, the step S200 of receiving, by the controller, the inspection instruction, and sending a driving instruction to a drive apparatus and an acquisition instruction to an image acquisition apparatus includes:

step S201: receiving, by the controller, the inspection instruction, and sending a reset instruction to the drive apparatus;

step S202: driving, by the drive apparatus, the image acquisition apparatus and the light source to move back to their initial inspection positions; and step S203: sending, by the controller, a driving instruction to the drive apparatus and an acquisition instruction to the image acquisition apparatus.

In this method, upon receipt of the inspection request, the server may send the inspection instruction to the controller. The controller first controls the image acquisition apparatus to reset and move to the initial inspection position, that is, the starting point for each inspection, and then controls the image acquisition apparatus to move for image acquisition. The starting point may be set as required, for example, the end of the frame close to the entrance. Calibration is performed using the home sensor disposed.

The provision of the reset program allows each inspection to start from the same position, improving the accuracy and consistency of the inspections.

Figure 12:
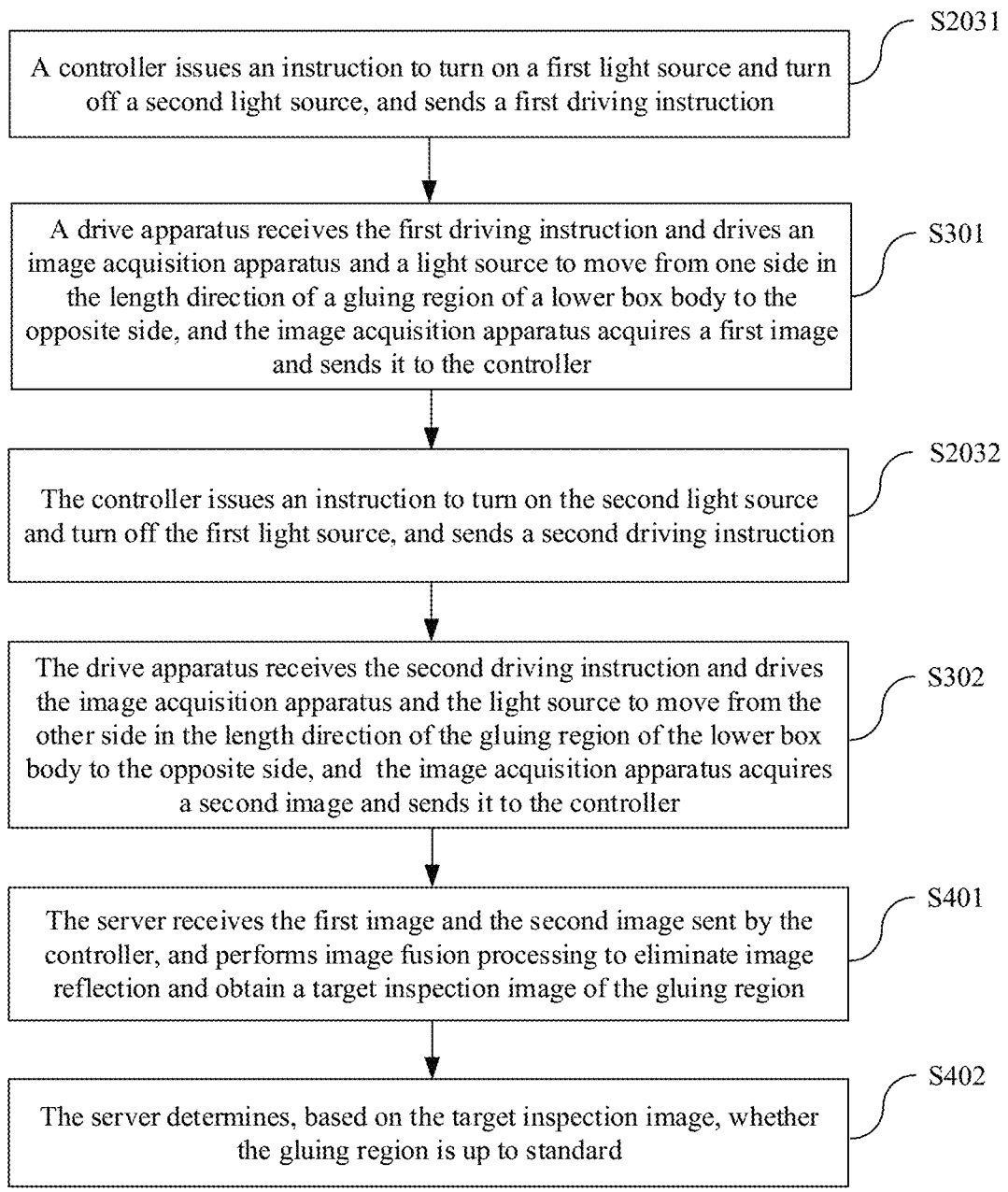
FIG. 12 is a flowchart of a third embodiment of an inspection method of an inspection system according to this application.

Referring to FIG. 12, in an embodiment of this application, the light source includes a first light source and a second light source. The first light source is disposed on one side of the image acquisition apparatus in a moving direction, the second light source is disposed on the other side of the image acquisition apparatus in the moving direction, the first light source and the second light source have different emission angles, and the inspection instruction includes acquiring at least a first image and a second image. The inspection method includes:

step S2031: issuing, by the controller, an instruction to turn on the first light source and turn off the second light source, and sending a first driving instruction;

step S301: receiving, by the drive apparatus, the first driving instruction and driving the image acquisition apparatus and the light source to move from one side in the length direction of the gluing region of the lower box body to the opposite side, and acquiring, by the image acquisition apparatus, the first image and sending it to the controller;

step S2032: issuing, by the controller, an instruction to turn on the second light source and turn off the first light source, and sending a second driving instruction;

step S302: receiving, by the drive apparatus, the second driving instruction and driving the image acquisition apparatus and the light source to move from the other side in the length direction of the gluing region of the lower box body to the opposite side, and acquiring, by the image acquisition apparatus, the second image and sending it to the controller;

step S401: receiving, by the server, the first image and the second image sent by the controller, and performing image fusion processing to eliminate image reflection and obtain a target inspection image of the gluing region; and step S402: determining, by the server based on the target inspection image, whether the gluing region is up to standard.

The first light source and the second light source may both be selected as the type of linear light source and are located on opposite sides to the image acquisition apparatus, where the first light source is disposed on one side of the image acquisition apparatus in the moving direction, that is, on one side close to the gluing region in the length direction, and the second light source is on the other side of the image acquisition apparatus in the moving direction, that is, on the other side close to the gluing region in the length direction. The first light source and the second light source have different light emission directions, and in one example, the emission axes of the two light sources are both inclined with respect to a direction towards the image acquisition apparatus so that illumination at different positions of the gluing region can be implemented, improving the quality of images acquired.

Taking a long side of the gluing region as a reference, for example, the first light source is close to the left side of the gluing region in the length direction and the second light source is close to the right side of the gluing region. The controller controls the image acquisition apparatus to move from the left side of the gluing region to the right side and acquire a first image while controlling the first light source to turn on, and controls the image acquisition apparatus to move from the right side of the gluing region to the left side and acquire a second image while controlling the second light source to turn on. This structure implements automatic acquisition of at least two images with different reflective positions, improving inspection efficiency.

A first image having a reflective region can be obtained with the cooperation of the first light source and the drive apparatus, and a second image having a reflective region can be obtained with the cooperation of the second light source and the drive apparatus. Due to the different positions and emission angles of the first light source and the second light source, positions of the reflective regions of the first image and the second image are different. The image fusion by the server on the two images can eliminate the reflective regions, giving a more realistic and complete inspection image of the gluing region and preventing oversight due to the reflections or the obstruction of the box body. Using such a target inspection image as the basis for determination can obtain a more accurate determination of the gluing condition, improving the inspection accuracy.

Figure 13:
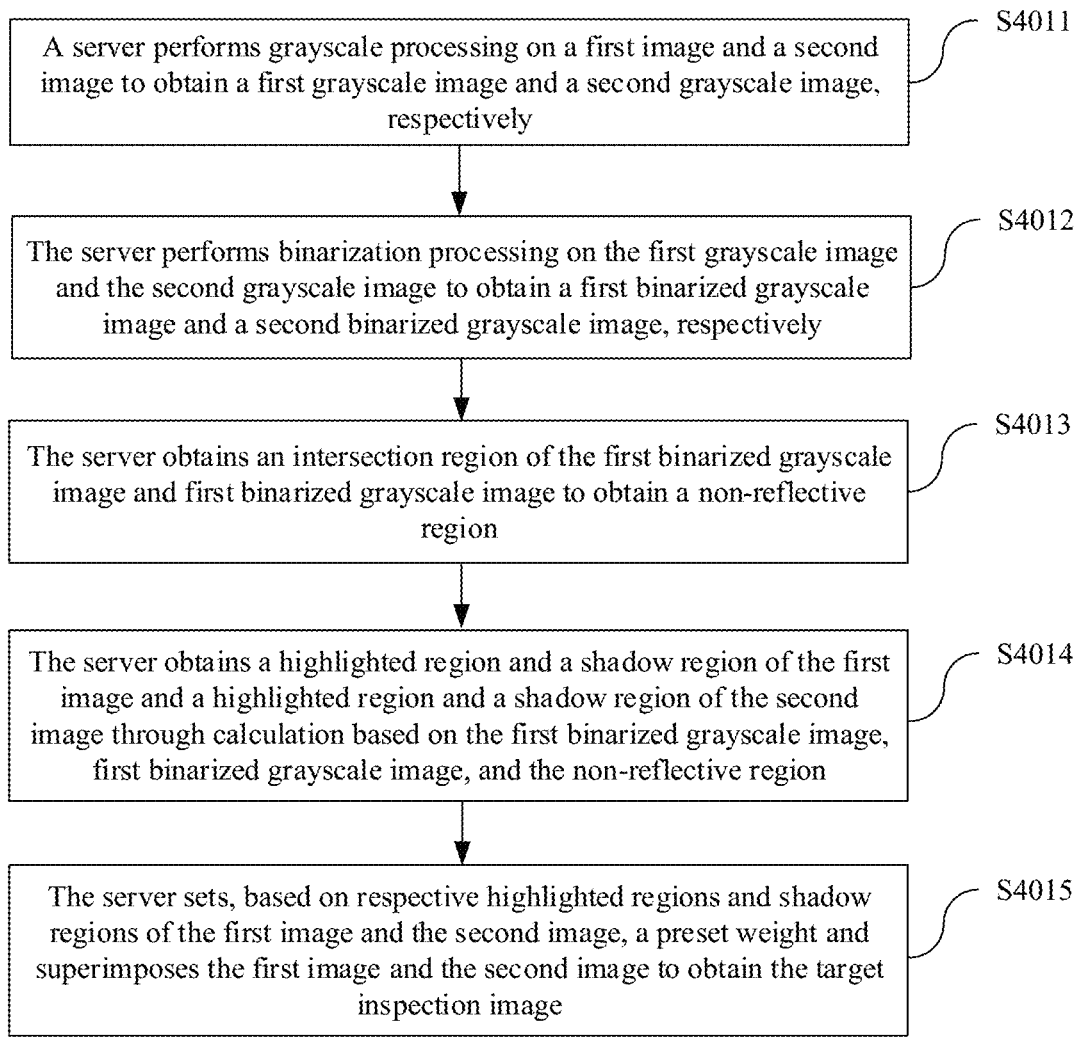
FIG. 13 is a flowchart of a fourth embodiment of an inspection method of an inspection system according to this application.

Referring to FIG. 13, in an embodiment of this application, the step S401 of receiving, by the server, the first image and the second image sent by the controller, and performing image fusion processing to eliminate image reflection and obtain a target inspection image of the gluing region includes:

step S4011: performing, by the server, grayscale processing on the first image and the second image to obtain a first grayscale image and a second grayscale image, respectively;

step S4012: performing, by the server, binarization processing on the first grayscale image and the second grayscale image to obtain a first binarized grayscale image and a second binarized grayscale image, respectively;

step S4013: obtaining, by the server, an intersection region of the first binarized grayscale image and first binarized grayscale image to obtain a non-reflective region;

step S4014: obtaining, by the server, a highlighted region and a shadow region of the first image and a highlighted region and a shadow region of the second image through calculation based on the first binarized grayscale image, first binarized grayscale image, and the non-reflective region; and step S4015: setting, by the server based on respective highlighted regions and shadow regions of the first image and the second image, a preset weight, and superimposing the first image and the second image to obtain the target inspection image.

In this inspection method, the grayscale processing in step S4011 refers to the grayscale conversion of the first image and the second image using a grayscale algorithm to form a respective grayscale image. The binarization processing in step S4012 refers to the binarization of the values of the pixel points in the images, for example, the assignment of value 1 if the brightness value is greater than a preset value and of value 0 if the brightness value is less than the preset value, so as to form the respective binarized grayscale images. In step S4013, obtaining an intersection region refers to obtaining a union of pixel points with the same coordinate values and numerical values in the first binarized grayscale image and the second binarized grayscale image. This union represents the region with no reflections in the two images, so the non-reflective region is obtained. In step S4014, the obtained non-reflective region can be mapped to the original positions in the first image and the second image to obtain a shadow region, respectively, and the remaining blank region is the highlighted region. In step S401, pixels of the marked first image and second image are superimposed according to the weight so as to obtain a final target inspection image.

The server performs fusion processing on the first image and the second image, and the grayscale processing and the binarization processing can determine the position of each pixel of the first image and the second image, so that when the two images are superimposed, it is more convenient to eliminate the reflective regions and obtain the target inspection image.

Figure 14:
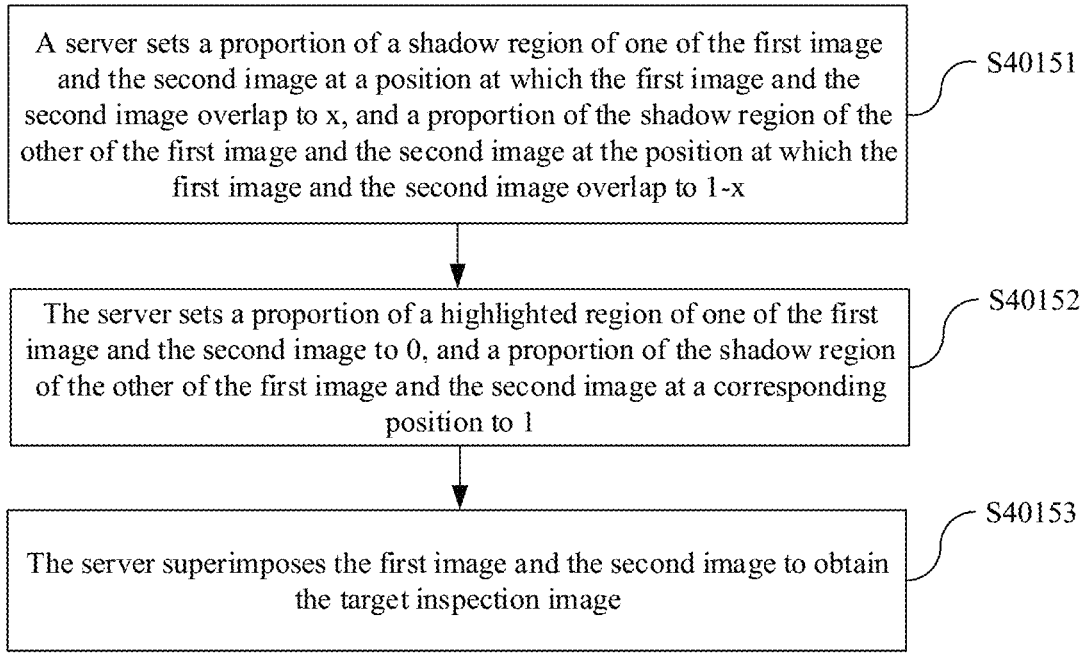
FIG. 14 is a flowchart of a fifth embodiment of an inspection method of an inspection system according to this application.

Referring to FIG. 14, in an embodiment of this application, the step of setting, based on respective highlighted regions and shadow regions of the first image and the second image, a preset weight, and superimposing the first image and the second image to obtain the target inspection image includes:

step S40151: setting, by the server, a proportion of a shadow region of one of the first image and the second image at a position at which the first image and the second image overlap to x, and a proportion of the shadow region of the other of the first image and the second image at the position at which the first image and the second image overlap to 1-x;

step S40152: setting, by the server, a proportion of a highlighted region of one of the first image and the second image to 0 and a proportion of a shadow region of the other of the first image and the second image at a corresponding position to 1; and step S40153: superimposing, by the server, the first image and the second image to obtain the target inspection image.

In this method, when the shadow region portions of the two images are superimposed, a ratio of the pixel values of the first image and the second image can be selected to be any value, which makes the superimposition more convenient. For example, if the ratio of the shadow region of the first image is selected to be 0.5, the ratio of the shadow region of the second image is also 0.5, and a resulting image will remain the same as the original image after the shadow regions are superimposed. The highlighted region of the corresponding first image has a ratio set to 0 and is completely replaced by the shadow region of the second image, and the highlighted region of the second image has a ratio set to 0 and is completely replaced by the shadow region of the first image, thereby obtaining a target inspection image with reflections eliminated.

Figure 15:
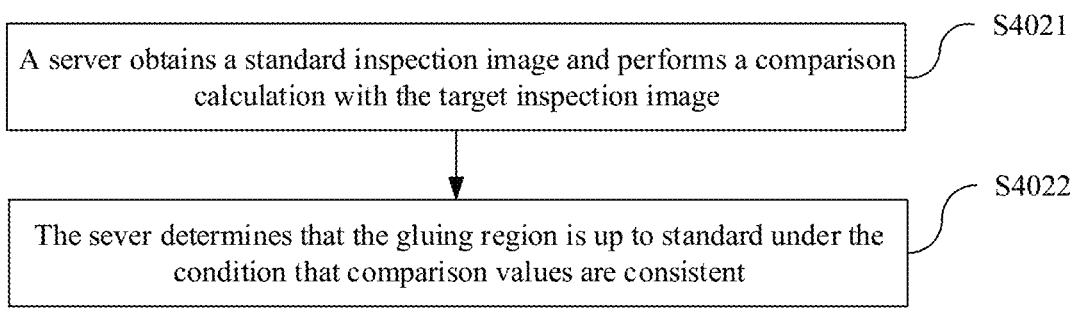
FIG. 15 is a flowchart of a sixth embodiment of an inspection method of an inspection system according to this application.

Referring to FIG. 15, in an embodiment of this application, the step of determining whether the gluing region is up to standard based on the target inspection image includes:

step S4021: obtaining, by the server, a standard inspection image and performing a comparison calculation with the target inspection image; and step S4022: determining by the sever that the gluing region is up to standard under the condition that comparison values are consistent.

In this inspection method, the inspection image has been subjected to coordinate quantization and color quantization, and if the values of the pixels at same positions in the standard inspection image and the target inspection image are the same, it means that the gluing position of the gluing region is up to standard; otherwise, the gluing position of the gluing region is not up to standard. Alternatively, the inspection image is grayscaled to determine whether there are obvious dark or bright spots in the target inspection image, in order to detect defects such as bubbles or debris. Further alternatively, RGB values of the target inspection image are compared with RGB values of the standard inspection image, and if the values are the same, it can be determined that the proportion of the AB adhesive in the gluing region is also up to standard.

In this way, the inspection method can achieve the effect of automatically determining whether the gluing region of the lower box body is up to standard by comparing and calculating the pixel values at every positions in the target inspection image and the standard inspection image and can implement the detection of bubbles, debris, and adhesive ratio, which is simple and convenient.

Figure 16:
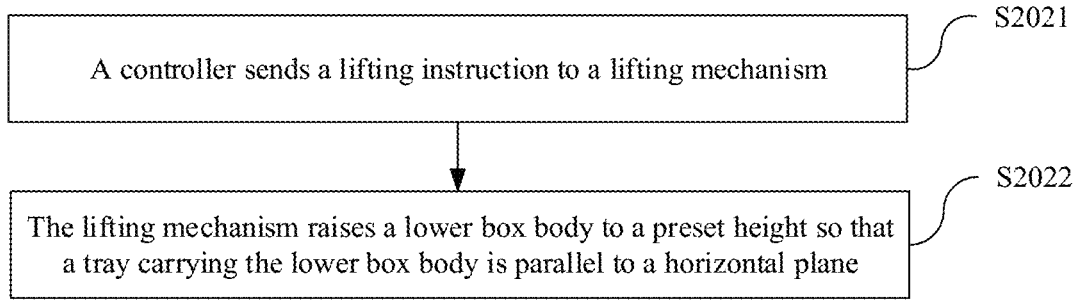
FIG. 16 is a flowchart of a seventh embodiment of an inspection method of an inspection system according to this application.

Referring to FIG. 16, in an embodiment of this application, the inspection system further includes a lifting structure, and after the step of driving, by the drive apparatus, the image acquisition apparatus and the light source to move back to their initial inspection positions, the inspection method includes the steps of:

step S2021: sending, by the controller, a lifting instruction to the lifting mechanism; and step S2022: raising, by the lifting mechanism, the lower box body to a preset height so that a tray carrying the lower box body is parallel to a horizontal plane.

Herein, with the provision of the lifting mechanism, all lower box bodies can be lifted to a same height so that lower box bodies with different height sizes can be matched, ensuring that an acquisition distance between the image acquisition apparatus and the gluing region is always consistent, so as to improve the accuracy of image acquisition.

Figure 17:
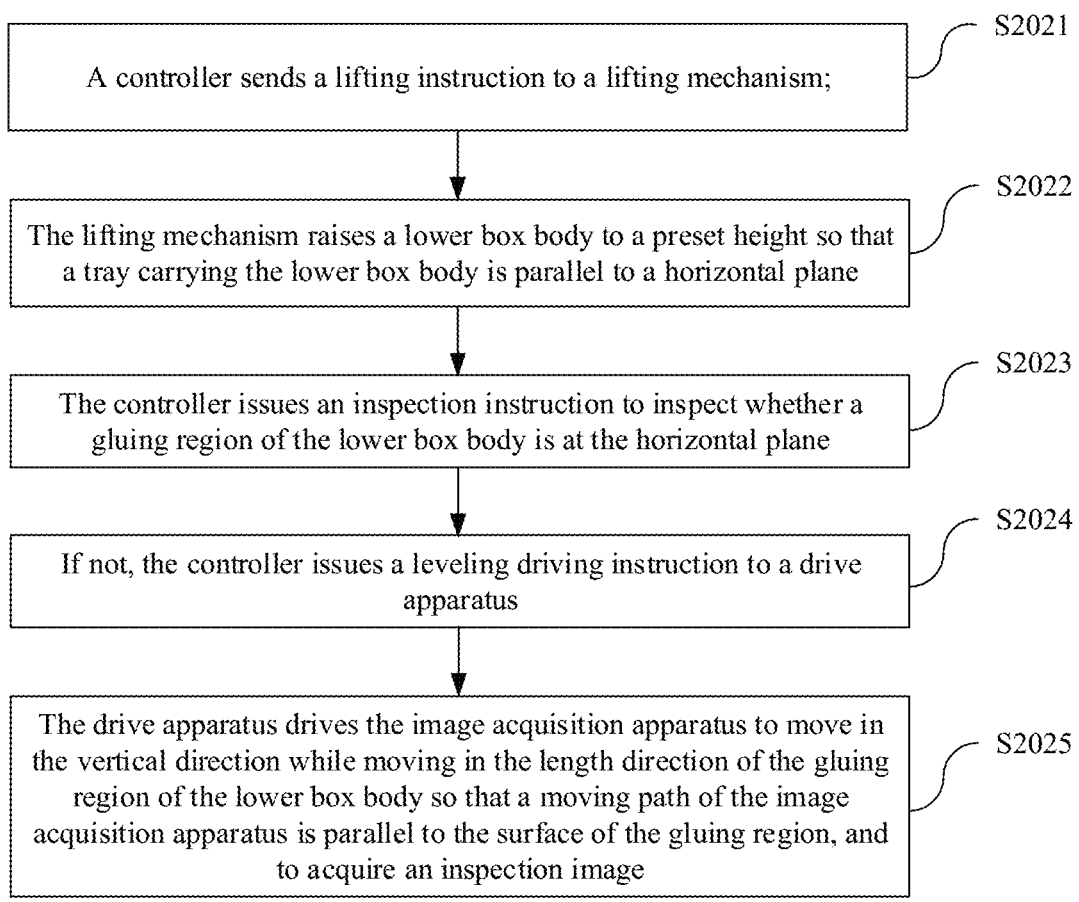
FIG. 17 is a flowchart of an eighth embodiment of an inspection method of an inspection system according to this application.

Referring to FIG. 17, in an embodiment of this application, after the step of raising, by the lifting mechanism, the lower box body to a preset height so that a tray carrying the lower box body is parallel to a horizontal plane, the inspection method further includes:

step S2023: issuing, by the controller, an inspection instruction to inspect whether the gluing region of the lower box body is at the horizontal plane;

step S2024: if not, issuing, by the controller, a leveling driving instruction to the drive apparatus; and step S2025: driving, by the drive apparatus, the image acquisition apparatus to move in the vertical direction while moving in the length direction of the gluing region of the lower box body so that a moving path of the image acquisition apparatus is parallel to the surface of the gluing region and to acquire an inspection image.

Herein, the drive apparatus drives the image acquisition apparatus to move in the length direction. With the provision of the second drive module, the image acquisition apparatus can be driven to move in the thickness direction, that is, the vertical direction, so as to adapt to a situation in which the gluing region is not in the same plane, so that a moving path of the image acquisition apparatus is always parallel to the surface of the gluing region, which further improves the accuracy of inspection image acquisition and the adaptability of the inspection system.

Figure 18:
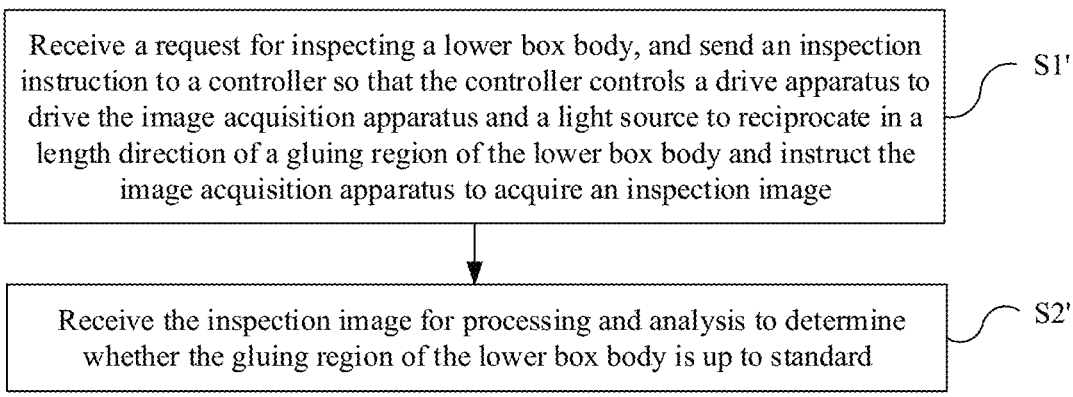
FIG. 18 is a flowchart of a ninth embodiment of an inspection method of an inspection system according to this application.

Referring to FIG. 18, this application further proposes an inspection method of an inspection system. The inspection system includes a visual inspection apparatus, a server, and a light source, and the inspection method of the inspection system includes the steps of:

step S1': receiving a request for inspecting a lower box body, and sending an inspection instruction to a controller so that the controller controls a drive apparatus to drive the image acquisition apparatus and a light source to reciprocate in a length direction of a gluing region of the lower box body and instruct the image acquisition apparatus to acquire an inspection image; and step S2': receiving the inspection image for processing and analysis to determine whether the gluing region of the lower box body is up to standard.

In step S1' of the foregoing method, when the lower box body is ready to enter the inspection channel, an inspection request can be sent to the server. The server confirms, according to the inspection environment, that the inspection can be carried out, and may choose to enable the grating gate at the entrance so that the trolley carrying the lower box body enters the inspection channel. The controller controls the drive apparatus and the image acquisition apparatus to operate according to the inspection instruction to acquire an inspection image. The drive apparatus drives the image acquisition apparatus to implement image acquisition of the gluing region, and the movement in this step is in the length direction. In other examples, the movement in the width direction may also be performed according to the size and shape of the gluing region. In step S2', after receiving the inspection image, the server performs a series of processing and analysis thereon. For example, coordinates of the inspection image are quantified so as to compare with a standard image. If the coordinate position of each pixel is the same, it means that the gluing position of the gluing region is up to standard; otherwise, the gluing position of the gluing region is not up to standard. Alternatively, the inspection image is grayscaled so as to determine whether there are obvious dark or bright spots, so as to detect defects such as bubbles or debris.

The inspection method can implement image acquisition of the entire gluing region of the lower box body, and process and analyze the inspection image to accurately determine whether there are defects such as bubbles, debris, or glue breakage, thereby making a better determination on whether the gluing on the lower box body is acceptable.

Figure 19:
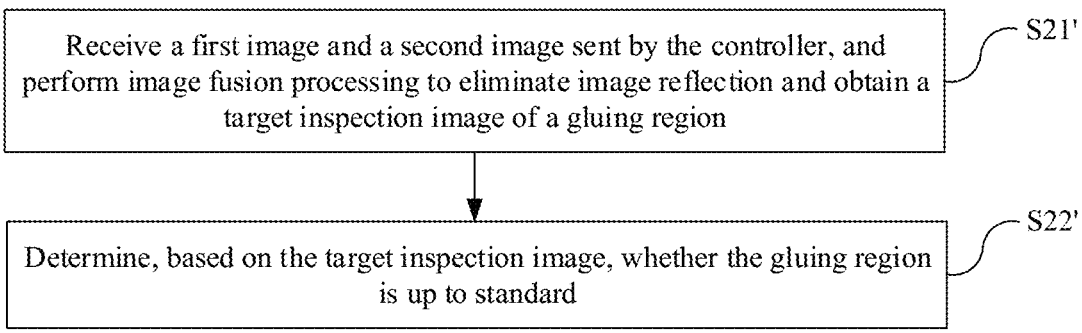
FIG. 19 is a flowchart of a tenth embodiment of an inspection method of an inspection system according to this application.

Referring to FIG. 19, in an embodiment of this application, the inspection instruction includes acquiring at least a first image and a second image, and the step of receiving the inspection image for processing and analysis to determine whether the gluing region of the lower box body is up to standard includes:

step S21': receiving the first image and the second image sent by the controller, and performing image fusion processing to eliminate image reflection and obtain a target inspection image of the gluing region; and step S22': determining, based on the target inspection image, whether the gluing region is up to standard.

Due to the different positions and emission angles of the first light source and the second light source, positions of the reflective regions of the first image and the second image are different. The image fusion by the server on the two images can eliminate the reflective regions, giving a more realistic and complete inspection image of the gluing region and preventing oversight due to the reflections or the obstruction of the box body. Using such a target inspection image as the basis for determination can obtain a more accurate determination of the gluing condition, improving the inspection accuracy.

Figure 20:
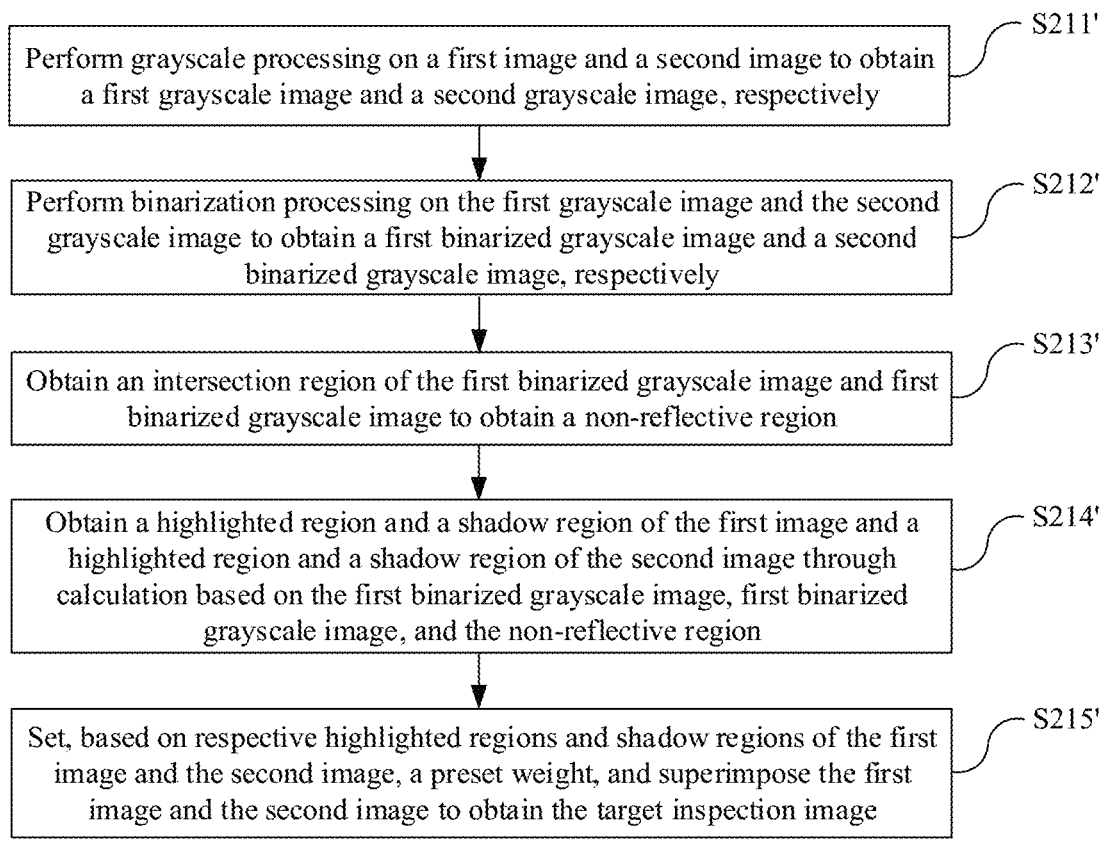
FIG. 20 is a flowchart of an eleventh embodiment of an inspection method of an inspection system according to this application.

Referring to FIG. 20, in an embodiment of this application, the step of receiving the first image and the second image sent by the controller, and performing image fusion processing to eliminate image reflection and obtain a target inspection image of the gluing region includes:

step S211': performing grayscale processing on the first image and the second image to obtain a first grayscale image and a second grayscale image, respectively;

step S212': performing binarization processing on the first grayscale image and the second grayscale image to obtain a first binarized grayscale image and a second binarized grayscale image, respectively;

step S213': obtaining an intersection region of the first binarized grayscale image and first binarized grayscale image to obtain a non-reflective region;

step S214': obtaining, a highlighted region and a shadow region of the first image and a highlighted region and a shadow region of the second image through calculation based on the first binarized grayscale image, first binarized grayscale image, and the non-reflective region; and step S215': setting, based on respective highlighted regions and shadow regions of the first image and the second image, a preset weight, and superimposing the first image and the second image to obtain the target inspection image.

In this inspection method, the grayscale processing in step S211' refers to the grayscale conversion of the first image and the second image using a grayscale algorithm to form a respective grayscale image. The binarization processing in step S212' refers to the binarization of the values of the pixel points in the images, for example, the assignment of value 1 if the brightness value is greater than a preset value and of value 0 if the brightness value is less than the preset value, so as to form the respective binarized grayscale images. In step S213', obtaining an intersection region refers to obtaining a union of pixel points with the same coordinate values and numerical values in the first binarized grayscale image and the second binarized grayscale image. This union represents the region with no reflections in the two images, so the non-reflective region is obtained. In step S214', the obtained non-reflective region can be mapped to the original positions in the first image and the second image to obtain a shadow region, respectively, and the remaining blank region is the highlighted region. In step S215', pixels of the marked first image and second image are superimposed according to the weight so as to obtain a final target inspection image.

The server performs fusion processing on the first image and the second image, and the grayscale processing and the binarization processing can determine the position of each pixel of the first image and the second image, so that when the two images are superimposed, it is more convenient to eliminate the reflective regions and obtain the target inspection image.

In an embodiment of this application, the step of setting, based on respective highlighted regions and shadow regions of the first image and the second image, a preset weight, and superimposing the first image and the second image to obtain the target inspection image includes:

setting a proportion of a shadow region of one of the first image and the second image at a position at which the first image and the second image overlap to x, and a proportion of the shadow region of the other of the first image and the second image at the position at which the first image and the second image overlap to 1-x;

setting a proportion of a highlighted region of one of the first image and the second image to 0 and a proportion of a shadow region of the other of the first image and the second image at a corresponding position to 1; and superimposing the first image and the second image to obtain the target inspection image.

In this method, when the shadow region portions of the two images are superimposed, a ratio of the pixel values of the first image and the second image can be selected to be any value, which makes the superimposition more convenient. For example, if the ratio of the shadow region of the first image is selected to be 0.5, the ratio of the shadow region of the second image is also 0.5, and a resulting image will remain the same as the original image after the shadow regions are superimposed. The highlighted region of the corresponding first image has a ratio set to 0 and is completely replaced by the shadow region of the second image, and the highlighted region of the second image has a ratio set to 0 and is completely replaced by the shadow region of the first image, thereby obtaining a target inspection image with reflections eliminated.

In an embodiment of this application, the step of determining whether the gluing region is up to standard based on the target inspection image includes:

obtaining a standard inspection image and performing a comparison calculation with the target inspection image; and determining that the gluing region is up to standard under the condition that comparison values are consistent.

It is possible to achieve the effect of automatically determining whether the gluing region of the lower box body is up to standard by comparing and calculating the pixel values at each position in the target inspection image and the standard inspection image, which is simple and convenient.

Specific Embodiment

An AGV trolley notifies, through network interaction, a server of letting the trolley in. Upon receiving the signal from the AGV trolley, the server notifies a hardware and software control apparatus to carry out a grating shielding operation and allow the trolley to enter.

After the trolley enters, the apparatus opens the entrance grating, and the lifting mechanism apparatus clamps the trolley and raises it up to a fixed height.

The hardware and software control apparatus starts to control a module, that is, an XYZ axis module of a gantry apparatus, to first carry out a reset operation to return to the zero origin, and then controls the XY axis module to scan according to a template path set by the server. Two light sources of an imaging system are turned on in turn by the hardware and software control apparatus.

After the completion of the scanning, the lifting mechanism apparatus carries out a reset operation, to be specific, the clamping cylinder is released and the lifting cylinder is lowered.

After analyzing and processing an image acquired by the imaging system, the server apparatus outputs a result to a display, and uploads the data to a MES.

The hardware and software control apparatus is notified to shield the exit grating, send a message to the AGV trolley for release operation, and after the trolley exits the station, enable the exit grating again and start a next cycle.

The foregoing descriptions are merely preferred embodiments of this application and are not intended to limit the patent scope of this application. Under the inventive concept of this application, any equivalent structural transformations made by using the content of the specification and drawings of this application, or direct or indirect application in other related technical fields are included in the patent protection scope of this application in the same way.

The invention claimed is:

1. A visual inspection apparatus, comprising:
   an image acquisition structure;
   a driver, wherein the driver is drivingly connected to the image acquisition structure for driving the image acquisition structure to reciprocate in a length direction of a gluing region of a lower box body and acquire an inspection image of the entire gluing region;
   a controller, wherein the controller is electrically connected to the image acquisition structure and the driver to control acquisition of the image acquisition structure and operation of the driver; and
   a light source, the light source is disposed on one side of the image acquisition structure and electrically connected to the controller, and the light source is configured to emit light toward the gluing region,
   wherein the light source is movably disposed relative to the image acquisition structure to adjust an emission angle of the light source relative to a horizontal plane; and/or
   an included angle between the emission angle of the light source and an axis of the image acquisition structure is in a range of greater than or equal to 30° to less than or equal to 60°.

2. The visual inspection apparatus according to claim 1, wherein the image acquisition apparatus comprises a line scan camera; and/or
   the light source comprises a linear light source.

3. The visual inspection apparatus according to claim 1, wherein the light source comprises a first light source and a second light source, the first light source is disposed on one side of the image acquisition structure in a moving direction, the second light source is disposed on the other side of the image acquisition structure in the moving direction, and the first light source and the second light source have different emission angles.

4. The visual inspection apparatus according to claim 3, wherein the controller is further configured to: turn on the first light source and control the image acquisition structure to move from one side in the length direction of the gluing region to the other side opposite thereto; and turn on the second light source and control the image acquisition structure to move from the other side in the length direction of the gluing region to the side opposite thereto.

5. An inspection method of a visual inspection apparatus, the visual inspection apparatus comprising a driver, an image acquisition structure, and a controller, wherein the inspection method comprises the steps of:
   sending a driving instruction to the driver so that the driver drives the image acquisition structure to reciprocate in a length direction of a gluing region of a lower box body, and sending an image acquisition instruction to the image acquisition structure so that the image acquisition structure acquires an inspection image of the gluing region; and
   obtaining the inspection image and sending it to a server,
   wherein the visual inspection apparatus comprises a light source which includes a first light source and a second light source, the first light source is disposed on one side of the image acquisition structure in a moving direction, the second light source is disposed on the other side of the image acquisition structure in the moving direction, and the first light source and the second light source have different emission angles; and
   wherein the inspection method of the visual inspection apparatus comprises:
   sending an instruction to turn on the first light source;
   sending a driving instruction to the driver to move the image acquisition structure from one side of the gluing region close to the first light source to the other side opposite thereto, and sending an acquisition instruction to the image acquisition structure to acquire a first image;
   obtaining the first image and sending it to a server;
   sending an instruction to turn on the second light source and turn off the first light source;
   sending a driving instruction to the driver to move the image acquisition structure from one side of the gluing region close to the second light source to the other side opposite thereto, and sending an acquisition instruction to the image acquisition structure for acquiring a second image; and
   obtaining the second image and sending it to the server, and
   wherein the light source is movably disposed relative to the image acquisition structure to adjust an emission angle of the light source relative to a horizontal plane; and/or
   an included angle between the emission angle of the light source and an axis of the image acquisition structure is in a range of greater than or equal to 30° to less than or equal to 60°.

6. An inspection system, comprising:
   a visual inspection apparatus, being the visual inspection apparatus according to claim 1; and
   a server, electrically connected to the controller and configured to receive and determine whether a gluing region is up to standard based on the inspection image.

7. The inspection system according to claim 6, wherein the inspection system further comprises a chassis, the chassis comprises two frames disposed oppositely and a cross beam slidably connected to the two frames, and a lower box body is accommodated between the two frames; and
   a driver of the visual inspection apparatus is mounted on the frame and drivingly connected to the cross beam, and the image acquisition structure is disposed on the cross beam and positioned above a gluing region of the lower box body to reciprocate in a length direction of the gluing region under the drive of the driver.

8. The inspection system according to claim 7, wherein the inspection system further comprises a first drive structure and a light source, the light source is disposed on one side of the image acquisition structure, and the first drive structure is disposed on the cross beam and drivingly connected to the image acquisition structure and the light source for driving the image acquisition structure and the light source to reciprocate in a width direction of the gluing region.

9. The inspection system according to claim 8, wherein the inspection system further comprises a second drive structure, the cross beam is fitted with a slider, the first drive structure is drivingly connected to the slider, the second drive structure is mounted on the slider and drivingly connected to the image acquisition structure and the light source for driving the image acquisition structure and the light source to reciprocate in a thickness direction of the gluing region.

10. The inspection system according to claim 7, wherein the inspection system further comprises a lifting structure, and the lifting structure is disposed between the two frames and drivingly connected to the lower box body for driving the lower box body to reciprocate in a vertical direction.

11. The inspection system according to claim 10, wherein the lifting structure comprises a base, a lifting assembly disposed in the base, and two clamping structures disposed oppositely, the two clamping structures are capable of moving towards or away from each other to clamp or release the lower box body, and the lifting assembly is drivingly connected to the clamping structures for driving the clamping structures up or down.

12. The inspection system according to claim 7, wherein the inspection system further comprises two grating gates, an inspection channel is formed between the two frames, an extension direction of the inspection channel is consistent with the length direction of the gluing region, and the inspection channel has an entrance and an exit disposed oppositely, wherein one of the grating gates is disposed at the entrance of the inspection channel, and the other one of the grating gates is disposed at the exit of the inspection channel.

13. The inspection system according to claim 7, wherein the inspection system comprises home sensors and limit sensors, the home sensors are disposed at initial positions of the image acquisition structure and the light source, and the limit sensors are disposed at moving paths of the image acquisition structure and the light source.

14. The inspection system according to claim 6, wherein the server is configured to send an inspection instruction to the controller to instruct the image acquisition structure to acquire at least two inspection images; and
the server is further configured to: obtain at least two inspection images, perform image fusion on the at least two inspection images to eliminate image reflection, and determine whether the gluing region is up to standard.

15. An inspection method of an inspection system, wherein the inspection system comprises a visual inspection apparatus, a server, and a light source, and the inspection method of the inspection system comprises the steps of:
receiving, by the server, a request for inspecting a lower box body, and sending an inspection instruction to a controller;
receiving, by the controller, the inspection instruction, and sending a driving instruction to a driver and an acquisition instruction to an image acquisition structure;
driving, by the driver, the image acquisition structure and the light source to reciprocate in the length direction of a gluing region of the lower box body, and acquiring, by the image acquisition structure, an inspection image and sending it to the controller; and
receiving, by the server, the inspection image sent by the controller for processing and analysis to determine whether the gluing region of the lower box body is up to standard,
wherein the step of receiving, by the controller, the inspection instruction and sending a driving instruction to a driver and an acquisition instruction to an image acquisition structure comprises:
receiving, by the controller, the inspection instruction, and sending a reset instruction to the driver;
driving, by the driver, the image acquisition structure and the light source to move back to their initial inspection positions; and
sending, by the controller, a driving instruction to the driver and an acquisition instruction to the image acquisition structure, and
wherein the inspection system further comprises a lifting structure, and after the step of driving, by the driver, the image acquisition structure and the light source to move back to their initial inspection positions, the inspection method comprises the steps of:
sending, by the controller, a lifting instruction to the lifting structure; and
raising, by the lifting structure, the lower box body to a preset height so that a tray carrying the lower box body is parallel to a horizontal plane.

16. The inspection method of the inspection system according to claim 15, wherein the light source comprises a first light source and a second light source, the first light source is disposed on one side of the image acquisition structure in a moving direction, the second light source is disposed on the other side of the image acquisition structure in the moving direction, the first light source and the second light source have different emission angles, and the inspection instruction comprises acquiring at least a first image and a second image; and the inspection method comprises:
issuing, by the controller, an instruction to turn on the first light source and turn off the second light source, and sending a first driving instruction;
receiving, by the driver, the first driving instruction and driving the image acquisition structure and the light source to move from one side in the length direction of the gluing region of the lower box body to the opposite side, and acquiring, by the image acquisition structure, the first image and sending it to the controller;
issuing, by the controller, an instruction to turn on the second light source and turn off the first light source, and sending a second driving instruction;
receiving, by the driver, the second driving instruction and driving the image acquisition structure and the light source to move from the other side in the length direction of the gluing region of the lower box body to the opposite side, and acquiring, by the image acquisition structure, the second image and sending it to the controller;
receiving, by the server, the first image and the second image sent by the controller, and performing image fusion processing to eliminate image reflection and obtain a target inspection image of the gluing region; and
determining, by the server based on the target inspection image, whether the gluing region is up to standard.

17. The inspection method of the inspection system according to claim 16, wherein the step of receiving, by the server, the first image and the second image sent by the controller, and performing image fusion processing to eliminate image reflection and obtain a target inspection image of the gluing region comprises:

performing, by the server, grayscale processing on the first image and the second image to obtain a first grayscale image and a second grayscale image, respectively;

performing, by the server, binarization processing on the first grayscale image and the second grayscale image to obtain a first binarized grayscale image and a second binarized grayscale image, respectively;

obtaining, by the server, an intersection region of the first binarized grayscale image and first binarized grayscale image to obtain a non-reflective region;

obtaining, by the server, a highlighted region and a shadow region of the first image and a highlighted region and a shadow region of the second image through calculation based on the first binarized grayscale image, first binarized grayscale image, and the non-reflective region; and setting, by the server based on respective highlighted regions and shadow regions of the first image and the second image, a preset weight, and superimposing the first image and the second image to obtain the target inspection image.

18. The inspection method of the inspection system according to claim 17, wherein the step of setting, by the server based on respective highlighted regions and shadow regions of the first image and the second image, a preset weight, and superimposing the first image and the second image to obtain the target inspection image comprises:

setting, by the server, a proportion of a shadow region of one of the first image and the second image at a position at which the first image and the second image overlap to x, and a proportion of the shadow region of the other of the first image and the second image at the position at which the first image and the second image overlap to 1-x;

setting, by the server, a proportion of a highlighted region of one of the first image and the second image to 0 and a proportion of a shadow region of the other of the first image and the second image at a corresponding position to 1; and superimposing, by the server, the first image and the second image to obtain the target inspection image.

19. The inspection method of the inspection system according to claim 16, wherein the step of determining, based on the target inspection image, whether the gluing region is up to standard comprises:

obtaining, by the server, a standard inspection image and performing a comparison calculation with the target inspection image; and determining by the sever that the gluing region is up to standard under the condition that comparison values are consistent.

20. The method of detecting an inspection system according to claim 15, wherein after the step of raising, by the lifting structure, the lower box body to a preset height so that a tray carrying the lower box body is parallel to a horizontal plane, the inspection method further comprises:

issuing, by the controller, an inspection instruction to inspect whether the gluing region of the lower box body is at the horizontal plane;

if not, issuing, by the controller, a leveling driving instruction to the driver; and driving, by the driver, the image acquisition structure to move in the vertical direction while moving in the length direction of the gluing region of the lower box body so that a moving path of the image acquisition structure is parallel to the surface of the gluing region and to acquire an inspection image.

21. An inspection method of an inspection system, wherein the inspection system comprises a visual inspection apparatus, a server, and a light source, and the inspection method of the inspection system comprises the steps of:

receiving a request for inspecting a lower box body, and sending an inspection instruction to a controller so that the controller controls a driver to drive the image acquisition structure and a light source to reciprocate in a length direction of a gluing region of the lower box body and instruct the image acquisition structure to acquire an inspection image; and receiving the inspection image for processing and analysis to determine whether the gluing region of the lower box body is up to standard, wherein the inspection instruction comprises acquiring at least a first image and a second image, and the step of receiving the inspection image for processing and analysis to determine whether the gluing region of the lower box body is up to standard comprises:

receiving the first image and the second image sent by the controller, and performing image fusion processing to eliminate image reflection and obtain a target inspection image of the gluing region; and determining whether the gluing region is up to standard based on the target inspection image.

22. The inspection method of the inspection system according to claim 21, wherein the step of receiving the first image and the second image sent by the controller, and performing image fusion processing to eliminate image reflection and obtain a target inspection image of the gluing region comprises:

performing grayscale processing on the first image and the second image to obtain a first grayscale image and a second grayscale image, respectively;

performing binarization processing on the first grayscale image and the second grayscale image to obtain a first binarized grayscale image and a second binarized grayscale image, respectively;

obtaining an intersection region of the first binarized grayscale image and first binarized grayscale image to obtain a non-reflective region;

obtaining a highlighted region and a shadow region of the first image and a highlighted region and a shadow region of the second image through calculation based on the first binarized grayscale image, first binarized grayscale image, and the non-reflective region; and setting, based on respective highlighted regions and shadow regions of the first image and the second image, a preset weight, and superimposing the first image and the second image to obtain the target inspection image.

23. The inspection method of the inspection system according to claim 22, wherein the step of setting, by the server based on respective highlighted regions and shadow regions of the first image and the second image, a preset weight, and superimposing the first image and the second image to obtain the target inspection image comprises:

setting a proportion of a shadow region of one of the first image and the second image at a position at which the first image and the second image overlap to x, and a proportion of the shadow region of the other of the first image and the second image at the position at which the first image and the second image overlap to 1-x;

setting a proportion of a highlighted region of one of the first image and the second image to 0 and a proportion of a shadow region of the other of the first image and the second image at a corresponding position to 1; and superimposing the first image and the second image to obtain the target inspection image.

24. The inspection method of the inspection system according to claim 21, wherein the step of determining, based on the target inspection image, whether the gluing region is up to standard comprises:

obtaining a standard inspection image and performing a comparison calculation with the target inspection image; and determining that the gluing region is up to standard under the condition that comparison values are consistent.

* * * * *